(12) United States Patent
Yoo et al.

(10) Patent No.: US 12,265,653 B2
(45) Date of Patent: Apr. 1, 2025

(54) METHOD, PROGRAM, AND DEVICE FOR AUTHENTICATING USER SETTING INFORMATION BY USING VIRTUAL CODE

(71) Applicant: SSENSTONE INC., Seoul (KR)

(72) Inventors: Chang-Hun Yoo, Seoul (KR); Min Gyu Kim, Yongin-si (KR)

(73) Assignee: SSENSTONE INC., Seoul (KR)

(*) Notice: Subject to any disclaimer, the term of this patent is extended or adjusted under 35 U.S.C. 154(b) by 632 days.

(21) Appl. No.: 17/551,176

(22) Filed: Dec. 14, 2021

(65) Prior Publication Data

US 2022/0108040 A1  Apr. 7, 2022

Related U.S. Application Data

(63) Continuation of application No. PCT/KR2021/002334, filed on Feb. 24, 2021.

(30) Foreign Application Priority Data

Feb. 24, 2020  (KR) .................. 10-2020-0022023
Dec. 7, 2020  (KR) .................. 10-2020-0169744
Feb. 24, 2021  (KR) .................. 10-2021-0025017

(51) Int. Cl.
   *G06F 21/78*  (2013.01)
   *G06F 21/31*  (2013.01)
   *G06F 21/60*  (2013.01)

(52) U.S. Cl.
   CPC .............. *G06F 21/78* (2013.01); *G06F 21/31* (2013.01); *G06F 21/604* (2013.01)

(58) Field of Classification Search
   CPC ......... G06F 21/78; G06F 21/31; G06F 21/604
   See application file for complete search history.

(56) References Cited

U.S. PATENT DOCUMENTS 6,681,228 B2  1/2004  Balogh
7,047,258 B2  5/2006  Balogh et al.
(Continued)

FOREIGN PATENT DOCUMENTS

CN  109389395 A  2/2019
EP  3 441 900 A1  2/2019
(Continued)

OTHER PUBLICATIONS

An Office Action mailed by the Korean Intellectual Property Office on Jun. 20, 2022, which corresponds to Korean Patent Application No. 10-2021-0025017 and is related to U.S. Appl. No. 17/551,176.
(Continued)

*Primary Examiner* — Ayoub Alata
(74) *Attorney, Agent, or Firm* — Studebaker Brackett PLLC

(57) ABSTRACT

A method, program, and device for authenticating user setting information by using a virtual code are proposed. The method includes: receiving, by a virtual code verification means, a virtual code; searching, by the virtual code verification means, a storage location of each of a plurality of UIDs on the basis of the virtual code; verifying, by the virtual code verification means, the virtual code on the basis of the plurality of searched UIDs; and performing, by the virtual code verification means, authority authentication on the basis of the plurality of searched UIDs.

9 Claims, 8 Drawing Sheets

(56) References Cited

U.S. PATENT DOCUMENTS

| | | |
|---|---|---|
| 7,167,877 B2 | 1/2007 | Balogh et al. |
| 7,203,682 B2 | 4/2007 | Balogh |
| 8,171,019 B2 | 5/2012 | Balogh |
| 8,630,988 B2 | 1/2014 | Balogh |
| 8,682,856 B2 | 3/2014 | Balogh |
| 9,830,328 B2 | 11/2017 | Faith et al. |
| 10,013,423 B2 | 7/2018 | Faith et al. |
| 10,262,001 B2 | 4/2019 | Faith et al. |
| 10,430,381 B2 | 10/2019 | Faith et al. |
| 10,983,960 B2 | 4/2021 | Faith et al. |
| 2003/0084038 A1 | 5/2003 | Balogh et al. |
| 2003/0084039 A1 | 5/2003 | Balogh |
| 2003/0084057 A1 | 5/2003 | Balogh |
| 2003/0084074 A1 | 5/2003 | Balogh et al. |
| 2003/0084075 A1 | 5/2003 | Balogh et al. |
| 2004/0254926 A1* | 12/2004 | Balogh ............... G06F 16/245 |
| 2005/0216744 A1* | 9/2005 | Skygebjer ....... G06Q 20/40145 |
| | | 713/182 |
| 2007/0100808 A1 | 5/2007 | Balogh |
| 2009/0106211 A1 | 4/2009 | Balogh |
| 2012/0102016 A1 | 4/2012 | Balogh |
| 2013/0204886 A1 | 8/2013 | Faith et al. |
| 2013/0204894 A1 | 8/2013 | Faith et al. |
| 2013/0246215 A1 | 9/2013 | Faith et al. |
| 2013/0246342 A1 | 9/2013 | Faith et al. |
| 2014/0108452 A1 | 4/2014 | Balogh |
| 2015/0365402 A1* | 12/2015 | Woo ..................... H04L 63/067 |
| | | 726/6 |
| 2017/0126408 A1* | 5/2017 | Van Someren ........ H04L 63/06 |
| 2017/0235786 A9 | 8/2017 | Faith et al. |
| 2018/0046623 A1 | 2/2018 | Faith et al. |
| 2018/0270223 A1 | 9/2018 | Woo |
| 2018/0341650 A1 | 11/2018 | Faith et al. |
| 2019/0050556 A1* | 2/2019 | Yoo ........................ G06F 21/45 |
| 2019/0050849 A1 | 2/2019 | Yoo |
| 2019/0050933 A1 | 2/2019 | Yoo |
| 2019/0205288 A1 | 7/2019 | Faith et al. |
| 2019/0361845 A1 | 11/2019 | Faith et al. |
| 2020/0051070 A1 | 2/2020 | Yoo |
| 2020/0051075 A1 | 2/2020 | Yoo |
| 2020/0133215 A1 | 4/2020 | Yoo |
| 2020/0134610 A1 | 4/2020 | Yoo |
| 2020/0202329 A1 | 6/2020 | Yoo |
| 2020/0320526 A1 | 10/2020 | Yoo |
| 2020/0342090 A1 | 10/2020 | Yoo |
| 2020/0342445 A1 | 10/2020 | Yoo |
| 2021/0185034 A1 | 6/2021 | Yoo |
| 2022/0261474 A1 | 8/2022 | Yoo |
| 2023/0185897 A1 | 6/2023 | Yoo |

FOREIGN PATENT DOCUMENTS

| | | | |
|---|---|---|---|
| EP | 3441926 A1 | 2/2019 | |
| JP | 2008-197919 A | 8/2008 | |
| JP | 2019-032501 A | 2/2019 | |
| JP | 2020-027653 A | 2/2020 | |
| KR | 101316466 B1 | 10/2013 | |
| KR | 20140127987 A | 11/2014 | |
| KR | 10-2019-0016698 A | 2/2019 | |
| KR | 20190016884 A | 2/2019 | |
| KR | 10-2005554 B1 | 7/2019 | |
| KR | 20200018228 A | 2/2020 | |

OTHER PUBLICATIONS

The extended European search report issued by the European Patent Office on Sep. 15, 2022, which corresponds to European Patent Application No. 21761076.5-1213 and is related to U.S. Appl. No. 17/551,176.

An Office Action; "Notice of Reasons for Refusal," mailed by the Japanese Patent Office on Jan. 10, 2023, which corresponds to Japanese Patent Application No. 2021-573775 and is related to U.S. Appl. No. 17/551,176.

An Office Action mailed by China National Intellectual Property Administration on Feb. 27, 2023, which corresponds to Chinese Patent Application No. 202180003905.2 and is related to U.S. Appl. No. 17/551,176.

International Search Report for PCT/KR2021/002334 mailed Jun. 4, 2021.

Written Opinion issued by the the Intellectual Property Office of Singapore dated May 17, 2023, in Singaporean Patent Application No. 11202113396T which is related to U.S. Appl. No. 17/551,176.

The extended European search report issued by the European Patent Office on May 28, 2024, which corresponds to European Patent Application No. 24161175.5-1206 and is related to U.S. Appl. No. 17/551,176.

* cited by examiner

METHOD, PROGRAM, AND DEVICE FOR AUTHENTICATING USER SETTING INFORMATION BY USING VIRTUAL CODE

TECHNICAL FIELD

The present disclosure relates to a method, program, and device for authenticating user setting information by using a virtual code.

BACKGROUND ART

A one-time password (OTP) is a method of authenticating a user by using a one-time password made of randomly generated numbers. The OTP authentication method is a system introduced to enhance security. Since user authentication is performed by generating the one-time password each time a user logs in, security vulnerabilities caused by the repeated use of the same password may be overcome.

However, in the existing OTP authentication method, at start, the user is identified through logging in by inputting a password and the like, and then an OTP is generated by using an OTP function assigned to the corresponding user, so that the authentication is completed through the generated OTP, whereby there is an inconvenience in that the user has to log in every time OTP authentication is performed.

Accordingly, there is a need for an invention capable of performing user authentication by generating an OTP without logging in whenever the user requests authentication. In addition, as a need for non-face-to-face business processing increases in various fields, there is the need for an invention capable of granting user authentication authority to another person in a non-face-to-face manner. In this case, the user authentication authority granted to another person should be used temporarily, and should be granted in a limited way only to a particular person designated by a user.

In addition, there is a problem in that it is difficult to verify validity of a virtual code when there is a technical difficulty with a communication device for verifying the validity of the virtual code.

Therefore, there is a need for an invention capable of determining and utilizing the validity of a virtual code on the basis of the virtual code that changes in real time without providing identification information about a user or device corresponding to the virtual code.

DISCLOSURE

Technical Problem

An objective of the present disclosure to be achieved by solving the problems is to provide a method, program, and device for control using a virtual code with improved security.

Another objective of the present disclosure to be achieved by solving the problems is to provide a method, program, and device for user authentication using a virtual code that allows a user to temporarily grant user authentication authority to another person in a non-face-to-face manner.

In addition, yet another objective of the present disclosure to be achieved by solving the problems is to provide a method, program, and device for user authentication using a virtual code that enables a user to set the limits of authority for each use purpose or set a time for granting the authority when the user grants user authentication authority to another person.

Still another objective of the present disclosure to be achieved by solving the problems is to provide a method and system configured to prevent redundant virtual codes issued by a seller after a transaction.

In addition, still another objective of the present disclosure to be achieved by solving the problems is to provide a method and system in which a validity period is given to a virtual code issued by a seller after a transaction so that a buyer is not allowed to use the virtual code after a predetermined period of time has elapsed after purchasing the virtual code.

The problems to be solved by the present disclosure are not limited to the problems mentioned above, and other problems not mentioned will be clearly understood by those skilled in the art from the following description.

Technical Solution

According to the present disclosure for achieving the above objectives, a method for authenticating user setting information by using a virtual code includes: receiving, by a virtual code verification means, the virtual code, wherein the virtual code is generated by a virtual code generation function included in a virtual code generation means registered in the virtual code verification means; searching, by the virtual code verification means, a storage location of each of a plurality of UIDs (User Identification) on the basis of the virtual code; verifying, by the virtual code verification means, the virtual code on the basis of the plurality of searched UIDs; and performing, by the virtual code verification means, a control command on the basis of the plurality of searched UIDs, wherein, when sequentially searching for the plurality of UIDs, the searching of the storage location is performed by using a previously searched UID to search for another UID.

In addition, the virtual code may include a plurality of detailed codes, and the searching of the storage location may include: searching for the storage location of any one of the plurality of UIDs on the basis of some of the plurality of detailed codes; and searching for another one of the plurality of UIDs on the basis of a remaining part of the plurality of detailed codes and any one of the searched UIDs.

In addition, the virtual code may include a first code, a second code, and a third code, and the searching of the storage location may include: searching for a storage location of a second UID on the basis of the second code and the third code; and searching for a storage location of a first UID on the basis of the first code and the second UID.

In addition, the virtual code may include the first code, the second code, and the third code, and the searching of the storage location may include: searching for the storage location of the second UID by setting the second code as a search start time point to the storage location of the second UID and setting the third code as a search path to the storage location of the second UID; and searching for the storage location of the first UID by setting the first code as a search start time point to the storage location of the first UID and setting the second UID or a code matched to and stored in the second UID as a search path to the storage location of the first UID.

In addition, the verifying of the virtual code may determine that the virtual code is a valid code when a UID searched last among the plurality of UIDs matches a previously stored UID, or information matched to and stored in the UID searched last among the plurality of UIDs matches a preset value.

In addition, the performing of the control command may be performed on the basis of control command information matched to and stored in at least one of the plurality of UIDs, and the control command corresponding to the at least one of the plurality of UIDs may be performed.

In addition, the performing of the control command may perform user authentication, the virtual code verification means may extract authority information matched to and stored in the storage location of each of the plurality of UIDs, and the virtual code verification means may perform the user authentication corresponding to the authority information.

In addition, in the present disclosure, a control program includes a virtual code used by the control program and stored in a medium in order to execute the method of any one of claims 1 to 7 in combination with a computer that is hardware.

In addition, in the present disclosure, a virtual code generation device includes: a detailed code generation part configured to generate a plurality of detailed codes on the basis of a plurality of UIDs (User Identification) registered in the virtual code generation device; a virtual code generation part configured to generate a virtual code by combining the plurality of detailed codes by using a virtual code generation function; and a virtual code provision part configured to transmit the generated virtual code to a virtual code verification device so that the virtual code verification device executes a control command corresponding to the virtual code, wherein the virtual code generation device generates the plurality of detailed codes so that any one of the plurality of UIDs is utilized for searching for the other one of the plurality of UIDs.

A virtual code verification device for authenticating a user includes: a virtual code reception part configured to receive a virtual code; a detailed code extraction part configured to extract a plurality of detailed codes from the virtual code; a storage location search part configured to search for a storage location of any one of a plurality of UIDs (User Identification) on the basis of the plurality of detailed codes; a virtual code verification part configured to verify the virtual code on the basis of the plurality of UIDs; and a controller configured to perform the control command on the basis of the plurality of UIDs, wherein the storage location search part sequentially searches for the plurality of UIDs, and uses a previously searched UID to search for another UID.

Advantageous Effects

According to the present disclosure as described above, there are provided various effects as follows:

First, when any one of a plurality of detailed codes constituting a virtual code is abnormal, a search for a storage location of a plurality of UIDs is not allowed to be performed. Accordingly, security of the virtual code may be improved.

Second, another person is provided a virtual code capable of temporarily performing user authentication, so that without coming in contact with another person, it is possible for a user to allow another person to perform the user authentication.

Third, a time during which a virtual code may be used is limited, so that a user may allow another person to perform user authentication only at a specific time without transmitting the virtual code to another person at the specific accurate time.

Fourth, the type of authority that may be granted to another person through a virtual code is limited, so that a user may selectively grant only necessary authority to another person.

Fifth, a virtual code generation function is stored in a virtual code generation device (e.g., a user terminal) that generates a virtual code, so that user information is extracted by using the virtual code, and an algorithm for verifying the virtual code is added to a virtual code verification device (e.g., a server, etc.) that verifies whether the virtual code is a normal code, whereby the leak of the algorithm for generating and verifying the virtual code may be prevented from occurring.

The effects of the present disclosure are not limited to the above-mentioned effects, and other effects not described above will be clearly understood by those skilled in the art from the following description.

MODE FOR INVENTIVE CONCEPT

Figure 1:
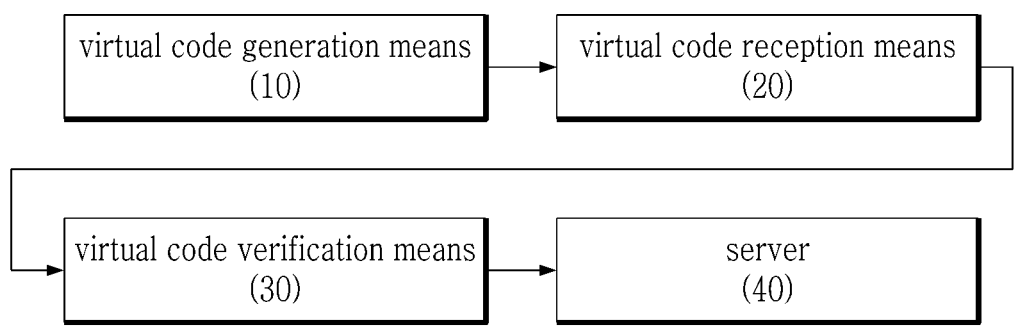
FIG. 1 is a block diagram illustrating a user authentication system using a virtual code according to an exemplary embodiment of the present disclosure.

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims.

The terminology used herein is for the purpose of describing particular exemplary embodiments only and is not intended to be limiting of the present disclosure. In this specification, the singular form also includes the plural form unless otherwise specified in the phrase. As used herein, "comprises" and/or "comprising" does not exclude the presence or addition of one or more other components in addition to the mentioned components. Like reference numerals refer to like components throughout the present specification, and "and/or" includes each and every combination of one or more of the mentioned components. It will be understood that, although the terms "first", "second", etc. may be used herein to describe various components, these components should not be limited by these terms. These terms are only used to distinguish one element from another element. Therefore, it is apparent that the first component mentioned hereinbelow may be the second component within the technical spirit of the present disclosure.

Unless otherwise defined, all terms (including technical and scientific terms) used in the present specification may be used in a sense that can be commonly understood by those skilled in the art. In addition, terms defined in the commonly used dictionary are not ideally or excessively interpreted unless specifically defined.

In the present specification, "financial transaction" refers to a process performed with a financial company. The "financial transaction" includes card payment, deposit and withdrawal from a bank account, and the like.

In the present specification, a "character" is a component constituting a code, and includes all or a part of uppercase letters, lowercase letters, numbers, and special characters.

In the present specification, a "code" refers to a character string in which characters are listed.

In the present specification, a "virtual code" is a code generated by a virtual code generation means, and refers to a code used to perform user authentication in a virtual code verification means. That is, the "virtual code" refers to a virtual code that is temporarily assigned to each unit count so that user information may be extracted and verified.

In the present specification, a "detailed code" refers to a part of a code included in a virtual code. Specifically, in the present specification, each of a plurality of detailed codes is referred to as a first code, a second code, and so on. The plurality of detailed codes is sequentially used to search for a plurality of UIDs, and in the present specification, it is described such that the larger a number prefixed to each detailed code is, the number is first used. For example, when a virtual code is composed of first to fourth codes, fourth and third codes are first used to search for the plurality of UIDs, and then the second and first codes are used in sequence.

In the present specification, a "unit count" is a unit defined as to be set at a specific time interval and be changed as the specific time interval elapses. For example, one count may be set as the specific time interval (e.g., 1.5 seconds) and be used.

In the present specification, a "virtual code generation function" refers to a function used to generate a virtual code.

In the present specification, "rolling movement" means that while rotating, an object performs translational motion. That is, the "rolling movement" means that the object moves while performing both a rotary motion and a translational motion, meaning that each point of the rotating object moves while being in contact with each moving axis progressively.

In the present specification, a "control command" refers to every control that may be performed by a virtual code verification means. For example, the "control command" may include "user authentication" and "authority to use a specific resource". More precisely, the "control command" is performed through "authority verification" in the virtual code verification means, such as "authenticating user's authority", "granting use authority for a specific resource", etc.

The type of "control command" is defined through "control command information", and the virtual code verification means extracts the "control command information" by using a virtual code and performs a "control command" corresponding to the extracted control command information.

In the present specification, "user authentication" refers to granting an "access authority" to a specific user, and means a process of approving a user to pass through an area requiring security, such as access, log-in, financial transaction, and the like, or to execute a function of a specific object.

In addition, in the present specification, the "user authentication" may be a type of "control command" defined by the "control command information". In the present specification, "access authority" is authority granted through user authentication, and when the "access authority" for a specific object is granted to a user, the user is in a state of being able to use a physical function included in the specific object. The physical function to be used as the "access authority" is granted may vary depending on the type of object. The type of access authority will be described later.

In the present specification, "granting authority to use a specific resource" means that an amount of electricity, gas, water, and the like purchased by a user is controlled to be usable. In the present specification, the "granting use authority for the specific resource" may be a type of "control command".

In the present specification, a "UID (User Identification)" refers to a value in the form of a unique code that is not redundantly given for each user in order to identify a user.

In the present specification, a "storage location" means a point (i.e., count) on a track corresponding to a time point at which registration of a UID is requested by a user.

In the present specification, "authority information" is information defined by "control command information", and is information that limits "access authority", "an amount purchased by a user", and the like. For example, "authority information" may define a validity period, a type of access authority, and the like. As another example, the "authority information" may be a charge amount of electricity or gas, which is purchased by the user through a seller.

In the present specification, "user information" means at least one piece of information including: a UID registered by a user in a virtual code generation device and a virtual code verification device; user's personal information; a unique value of the virtual code generation device; and a unique value of the virtual code verification device.

Hereinafter, the exemplary embodiment of the present disclosure will be described in detail with reference to the accompanying drawings.

FIG. 1 is a block diagram illustrating a control system using a virtual code according to the exemplary embodiment of the present disclosure.

As shown FIG. 1, the control system includes: a virtual code generation means 10, a virtual code reception means 20, a virtual code verification means 30, and a server 40. However, the control system may not include the server 40.

The virtual code generation means 10 refers to a device in which a dedicated program or a dedicated application (hereinafter, a dedicated program 11) for generating a virtual code is built-in or installed. More specifically, the virtual code generation means 10 may be a seller's server, or a terminal of a user who grants access authority for the virtual code verification means 30 to another person.

In the exemplary embodiment, the virtual code generation means 10 may transmit, to another device, a virtual code granted with temporary and/or limited access authority. The virtual code verification means 30 to be described later may perform user authentication by using the virtual code.

In another exemplary embodiment, the virtual code generation means 10 may be the seller's server. A user purchases a certain item from the seller's server. For example, the user may purchase use authority for electricity, gas, water, and the like through the seller's server. The seller's server issues a virtual code so that the user may use electricity, gas, water, and the like as much as a purchased amount.

As another example, the user may purchase use authority for data through the seller's server. The seller's server issues a virtual code so that the user may use the data as much as a purchased amount.

In an exemplary embodiment, the virtual code generation means 10 may be initially registered in the virtual code verification means 30 or the server 40, which is to be described later. A method of initially registering the virtual code generation means 10 will be described later. However, the virtual code generation means 10 does not necessarily need to be initially registered in the virtual code verification means 30, and the virtual code verification means 30 may be shipped in a state of having the virtual code generation means 10 registered therein.

In addition, in the exemplary embodiment, the dedicated program 11 serves to generate a virtual code by using at least one UID. Here, the UID may be information stored in both the virtual code generation means 10 and the server 40, and authority information may be matched to and stored in a storage location of the UID.

Meanwhile, a UID is not necessarily stored in a memory built in the virtual code generation means 10. For example, the UID may be stored in a card or a wearable device, which is capable of performing separate wireless communication, and a user causes a terminal having the UID stored therein to transmit the UID to the virtual code generation means 10, thereby enabling the virtual code generation means 10 to generate a virtual code.

Meanwhile, by including a virtual code generation function, the dedicated program 11 generates a virtual code by using a UID. For example, the dedicated program 11 generates the virtual code by using the UID as seed data of the virtual code generation function.

Here, the dedicated program 11 may generate a virtual code by using a plurality of UIDs. Specifically, the dedicated program 11 generates the virtual code so that any one of the plurality of UIDs may be used to search for the other of the plurality of UIDs. In this way, the dedicated program 11 generates the virtual code in which the plurality of UIDs may be searched for in stages by using one virtual code. A detailed description thereof will be described later.

Meanwhile, the dedicated program 11 may generate a virtual code by using, as seed data, a unique value of the virtual code generation means or a unique value of the virtual code verification means. At least one of the plurality of UIDs described herein may be replaced with user information.

In the exemplary embodiment, the dedicated program 11 may generate a virtual code by using, as seed data, a serial number of a vehicle, door lock, vendor server, or terminal. However, the present disclosure is not limited thereto, and the dedicated program 11 may generate a virtual code by using various data as seed data. This will be described later.

In addition, in the exemplary embodiment, the dedicated program 11 serves to register the virtual code generation means 10 to the virtual code verification means 30 or the server 40. That is, a user installs the dedicated program 11 in a virtual code generation means 10 (i.e., a user terminal), and the dedicated program 11 registers a UID by transmitting the UID to the virtual code verification means 30 or the server 40. However, the present disclosure is not limited thereto, and the dedicated program 11 may be a program built in the virtual code generation means 10 when shipped from a factory.

As a specific example, the dedicated program 11 receives a UID input from a user at the time of registration, or generates user information on the basis of user's login information of the dedicated program 11. Thereafter, the dedicated program 11 transmits the user information to the virtual code verification means 30 or the server 40. As the virtual code verification means 30 or the server 40 registers the UID in a specific count, from the virtual code verification means 30 or the server 40, the dedicated program 11 receives a virtual code generation function, or receives setting data for specifying the virtual code generation function. In this way, in the virtual code verification means 30 or the server 40, the dedicated program 11 may include the virtual code generation function that generates a virtual code capable of searching for a specific count in which user information is registered.

In the exemplary embodiment, the virtual code generation means 10 may transmit a text message including the virtual code to the virtual code reception means 20. A user of the virtual code generation means 10 may transmit the text message to the virtual code reception means 20 at a time when the user desires to grant access authority to a user of the virtual code reception means 20.

In another exemplary embodiment, the text message may be transmitted to the virtual code reception means 20 through short-range communication (e.g., NFC communication). In this case, the user of the virtual code generation means 10 may transmit the virtual code through contact with the virtual code reception means 20.

In another exemplary embodiment, the virtual code generation means 10 may not transmit the generated virtual code to the virtual code reception means 20, but may output the generated virtual code through a display means or a printing means, which is provided in the virtual code generation means 10. The user may directly input the output virtual code into the virtual code verification means 30. In this case, the system according to the present disclosure may not include the virtual code reception means 20.

A communication part included in the virtual code reception means 20 serves to communicate with the virtual code generation means 10 and the server 40 to transmit and receive a virtual code. Here, in addition to NFC (Near Field Communication), the communication part may use Bluetooth, BLE (Bluetooth Low Energy), Beacon, RFID (Radio Frequency Identification), infrared communication (Infrared Data Association, IrDA), Ultra-Wideband (UWB), ZigBee, and the like as a wireless communication method.

As a specific example, the communication part may be an NFC (Near Field Communication) communication part (e.g., NFC antenna) connected to an IC chip. For example, the user of the virtual code reception means 20 may transmit the received virtual code to the virtual code verification means 30 by tagging the virtual code verification means 30.

For another example, the virtual code reception means 20 receives a virtual code (e.g., as a text message) and displays the received virtual code on a display part included in the virtual code reception means 20. A user of the virtual code reception means 20 may perform user authentication by inputting the virtual code displayed on the display part into the virtual code verification means 30.

The virtual code verification means 30 is an object to which a user of the virtual code generation means 10 grants user authentication authority to another person. Another person who has received a virtual code may obtain access authority to the virtual code verification means 30 by using the virtual code.

For example, the virtual code verification means 30 may be a financial transaction device, a mobile terminal, a vehicle, a door lock, and the like. However, the present disclosure is not limited thereto, and the virtual code verification means 30 includes any device to which access authority may be granted through user authentication.

Meanwhile, a virtual code is not used only for the access authority to the virtual code verification means 30. Based on the virtual code, information that is matched to each UID may vary. Therefore, according to the matched information, the virtual code verification means 30 may approve various types of authority, such as user authentication, financial transaction approval, and process approval. For example, it is assumed that a virtual code is generated as seed data with "user identification information", "authority information for a specific process", "authority type", "retention period of authority", and the like. In this case, the virtual code verification means 30 does not grant access authority on the basis of a virtual code, but grants the user the authority corresponding to the information included in the virtual code. That is, what a user obtains through the virtual code is not limited to "access authority".

The virtual code verification means 30 receives a virtual code and performs a control command corresponding to the virtual code.

Meanwhile, as described above, according to the exemplary embodiment, a virtual code may not include control command information for the virtual code verification means 30 itself. The virtual code may be generated on the basis of a plurality of pieces of user information, for example, seed data such as biometric data, specific card data, resident registration number, mobile phone number, and the like. Therefore, when a virtual code is generated on the basis of the above-described plurality of pieces of user information, the virtual code verification means 30 performs only a process of verifying and authenticating a user, and does not perform a specific control command. However, in the present specification, in order to help understanding of the present disclosure, it will be described that the control command for the virtual code verification means 30 is executed by using the virtual code generated by user's virtual code generation means 10. However, such description does not limit the present disclosure.

In the exemplary embodiment, the control command may be performed for user authentication. The virtual code verification means 30 directly performs user authentication by receiving a virtual code, or transmits the virtual code to the server, so that the user authentication is allowed to be performed through the server.

In another exemplary embodiment, in a case where a device for performing control corresponding to control command information is a meter, the control command information may be a charge amount of electricity, gas, or water. The meter controls so that electricity, gas, water, and the like may be used as much as the charge amount defined by the control command information. However, the type of control defined by the control command information is not limited thereto.

In yet another exemplary embodiment, in a case where a device for performing control corresponding to control command information is personal mobility, the control command information may be an operation and an available time of the corresponding personal mobility. The personal mobility is controlled so as to be used only for the operation defined by the control command information, and used as much as the available time defined by the control command information.

In still another exemplary embodiment, in a case where a device for performing control corresponding to control command information is a vehicle in the car sharing service field, the control command information may be access, starting, use time, and the like of the vehicle. The vehicle enables a user to access the vehicle during the use time or within the use time, which is defined by the control command information, and to issue a control command such as the starting of the vehicle.

The virtual code verification means 30 receives a virtual code, and on the basis of the virtual code, sequentially searches for a location in which a plurality of UIDs is stored. A method of searching for a storage location will be described later. Thereafter, the virtual code verification means 30 performs a control command on the basis of the searched UID.

In another exemplary embodiment, the virtual code verification means 30 receives a virtual code, and transmits the received virtual code to the server 40. The server 40 receives the virtual code, and on the basis of the virtual code, searches for a storage location where a UID is stored. Thereafter, the server 40 performs user authentication on the basis of the searched UID, and transmits whether a user is authenticated or not to the virtual code verification means 30.

Meanwhile, the virtual code verification means 30 itself may be the server 40. In the exemplary embodiment, the user of the virtual code generation device 100 registers the virtual code generation device 100 in the virtual code verification means 30 through the dedicated program 11, and the virtual code verification means 30 may store the user information in a memory included in the virtual code verification means 30.

In another exemplary embodiment, the system according to the present disclosure may not include the server 40. The virtual code verification means 30 receives a virtual code and searches a storage location of a UID from the virtual code. Thereafter, the virtual code verification means 30 extracts the control command information matched to and stored in the storage location of the searched UID, and performs control corresponding to the extracted control command information.

The virtual code verification means 30 searches the storage location of the UID, and then extracts the control command information matched to and stored in the UID. Here, at every preset period, the virtual code verification means 30 changes the control command information matched to and stored in the UID.

Unless otherwise stated, in the present specification, it is described that the extraction of control command information based on a virtual code may be performed by the virtual code verification means 30 or the server 40. That is, it is obvious that the exemplary embodiment of extracting the control command information based on the virtual code from any one of the virtual code verification means 30 and the server 40 may be applied to the other one of the virtual code verification means 30 and the server 40.

The virtual code verification means 30 includes a communication part, and the communication part communicates with the virtual code generation means 10, virtual code reception means 20, and server 40 so as to transmit and receive a virtual code, and makes the virtual code usable in performing user authentication. Here, in addition to NFC (Near Field Communication), the communication part may use Bluetooth, BLE (Bluetooth Low Energy), Beacon, RFID (Radio Frequency Identification), infrared communication (i.e., Infrared Data Association; IrDA), Ultra-Wideband (UWB), ZigBee, and the like as a wireless communication method. However, the present disclosure is not limited thereto, and the virtual code verification means may be provided with a communication module for remote wireless communication. However, the present disclosure is not limited thereto, and the virtual code verification means may not include the communication part.

In the exemplary embodiment, the virtual code verification means 30 grants access authority through user authentication. The access authority may vary depending on the type of the virtual code verification means 30. In the exemplary embodiment, in a case where the virtual code verification means 30 is a vehicle, access authority may be the vehicle interior access authority, and when the vehicle interior access authority is granted, the vehicle unlocks a door lock thereof to enable a user to enter the interior of the vehicle.

For example, in addition to the above-described car sharing service field, granting another person's access authority to a specific user may be possible. More specifically, when it is assumed that the virtual code verification means 30 is a vehicle, access authority may be granted through user authentication so that services such as car washing and car repair may be provided.

In another exemplary embodiment, in a case where the virtual code verification means 30 is a door lock, access authority may be the building interior access authority, and when the building interior access authority is granted, the building unlocks a door lock thereof so as to allow a user to enter the interior of the building.

In another exemplary embodiment, in a case where the virtual code verification means 30 is a mobile terminal, access authority may be the use authority for the mobile terminal, and when the use authority for the mobile terminal is granted, the mobile terminal releases a terminal lock state, so that a user is in a state in which the built-in functions of the mobile terminal may be used.

In another exemplary embodiment, in a case where the virtual code verification means 30 is a meter of electricity, gas, water, and the like, the virtual code verification means 30 enables a user to use electricity, gas, water, and the like as much as a use amount corresponding to the extracted control command information.

Meanwhile, the access authority of the virtual code verification means 30 may be granted in stages. In the exemplary embodiment, in a case where the virtual code verification means 30 is a vehicle, the access authority to the vehicle may include the vehicle interior access authority, vehicle starting authority, and vehicle driving authority. The vehicle starting authority is authority in which a vehicle may be started and devices provided in the vehicle may be used, but the vehicle is unable to be driven. When only the corresponding vehicle starting authority is granted, the vehicle is not driven. In addition, the vehicle driving authority is the authority to be able to use all functions of the vehicle including driving the vehicle. The user may selectively grant the above-described type of authority to another person.

In another exemplary embodiment, in a case where the virtual code verification means 30 is a mobile terminal, access authority may be granted for each application provided in the mobile terminal. For example, a user may grant only access authority to a camera application provided in the mobile terminal to another person.

Meanwhile, the user of the virtual code generation means 10 may set a time period in which access authority to the virtual code verification means 30 is granted. In the exemplary embodiment, the user of the virtual code generation means 10 transmits validity period information to the virtual code verification means 30 or the server 40 through the virtual code generation means 10, and the virtual code verification means 30 or the server 40 stores the validity period information by matching the validity period information to the previously stored UID. Thereafter, the virtual code verification means 30 or the server 40 determines whether to authenticate the user or not on the basis of the stored validity period information. This will be described later.

The server 40 serves to receive a virtual code and extract control command information. To this end, the user initially registers a UID in the server 40 through the virtual code generation means 10.

In the exemplary embodiment, the user may transmit the UID to the server 40 through the dedicated program 11. Thereafter, through the dedicated program 11, the user may store authority information by matching the authority information to the UID stored in the server 40. The server 40 may store the authority information by matching the authority information to the storage location of the UID.

In the exemplary embodiment, the UID may be used as seed data when the virtual code generation means 10 generates a virtual code.

The server 40 searches for a location where the UID is stored in the server 40 on the basis of a virtual code generated by the virtual code generation means 10, and verifies the virtual code on the basis of a time point when the virtual code is received and a time point when the virtual code is generated by the virtual code generation means 10. A method of verifying a virtual code and extracting setting information to perform user authentication will be described in detail later.

Figure 2:
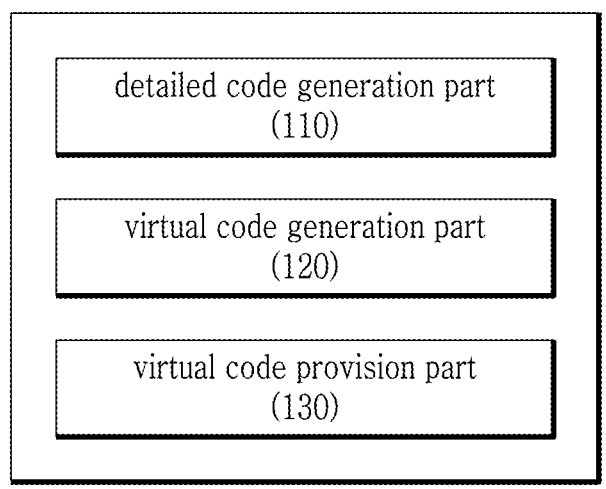
FIG. 2 is a block diagram illustrating a virtual code generation device according to the exemplary embodiment of the present disclosure.

FIG. 2 is a block diagram illustrating a virtual code generation device according to the exemplary embodiment of the present disclosure.

As shown in FIG. 2, the virtual code generation device 100 includes a detailed code generation part 110, a virtual code generation part 120, and a virtual code provision part 130.

In the exemplary embodiment, the virtual code generation device 100 may be a user terminal in which a program (i.e., an application) for generating a virtual code is installed. The virtual code generation device 100 is the above-described virtual code generation means 10.

The detailed code generation part 110 serves to generate one or more detailed codes on the basis of user information.

A virtual code generation function includes one or more detailed code generation functions. For example, when the virtual code includes a plurality of detailed codes, the virtual code generation function generates the plurality of detailed codes by using a plurality of detailed code generation functions, and generates a virtual code by using a detailed code combination function for combining the plurality of detailed codes.

In this case, the virtual code is generated for each unit count by the virtual code generation device 100, that is, the dedicated program 11 built-in or installed inside the user terminal, and the virtual code refers to a mobile OTP (mOTP).

In the exemplary embodiment, the virtual code generation device 100 may use at least a piece of user information stored in the virtual code generation device 100 as one piece of seed data of the virtual code generation function. As a specific example, by using one detailed code generation function, the detailed code generation part 110 uses a UID as seed data of each detailed code generation function to generate each detailed code. In this case, the detailed code generation part 110 may generate each detailed code by using even a count value or a time point when user authentication is requested from a user.

As the exemplary embodiment, the detailed code generation part 110 may generate a first code and a second code by including a first function and a second function as the detailed code generation functions. In this case, the virtual code generation device 100 only includes the first function for generating the first code and the second function for generating the second code as the detailed code generation functions in order to increase security, but the data on a correlation between the first code and the second code may not be included.

The virtual code generation part 120 serves to generate a virtual code by using a virtual code generation function, and by combining one or more detailed codes. In the exemplary embodiment, the virtual code is generated by combining the plurality of detailed codes according to a specific rule. The virtual code generation function includes a rule for combining the plurality of detailed codes (i.e., the detailed code combination function). That is, the virtual code generation part 120 may combine one or more detailed codes by using the detailed code combination function included in the virtual code generation function.

Various methods may be applied as the method of generating one virtual code by combining the plurality of detailed codes. As an example of the detailed code combination function, the virtual code generation part 120 may generate a virtual code in a way of alternately arranging an N-digit first code and an N-digit second code. In addition, as another example, the detailed code combination function may be a function of combining the second code at the end of the first code. As the number of detailed codes included in the virtual code increases, various detailed code combination functions may be generated as well.

In addition, in the exemplary embodiment, when a virtual code is generated by a combination according to a specific rule for a first code and a second code, the first code and the second code may perform respective roles for searching for a storage location of a UID storing user information within a storage location search algorithm. For example, the first code sets a start point of searching for a storage location, and the second code sets a search path from the start point to the storage location of the UID according to a specific search method. That is, when the virtual code generated normally for each unit count is provided by the virtual code generation device 100, the virtual code verification device 200 determines that a point moved along the search path corresponding to the second code from the search start point corresponding to the first code is the point where user information is stored (i.e., the storage location of the UID). A specific method of searching for a storage location of a UID on the basis of a first code and a second code, which are constituting a virtual code will be described later.

Meanwhile, the detailed code generation part 110 may generate three or more detailed codes. In the exemplary embodiment, the detailed code generation part 110 may generate first to fourth codes by including first to fourth functions as the detailed code generation functions. In this case, the virtual code generation device 100 may only include functions for generating each code as the detailed code generation functions in order to increase security, and may not include data on correlations between the first to fourth codes.

In the exemplary embodiment of the method in which the detailed code generation part 110 generates a detailed code, the detailed code generation part 110 generates a new detailed code for each unit count, and accordingly, the virtual code generation device 100 generates a new virtual code for each unit count. A virtual code newly generated for each unit count is not generated redundantly. Specifically, the detailed code generation part 110 may be set in such a way that the newly generated virtual code for each unit count is not generated redundantly for a specific user or a specific virtual code generation device 100 for a predetermined period, and is not generated redundantly between users belonging to a specific group as well.

In a specific exemplary embodiment of preventing redundant generation of the virtual code, when generating N-digit first or second code with M characters, the detailed code generation function included in the virtual code generation function may generate $M^N$ numbers of codes as a first code or a second code, and each code is matched for each count from the initial time when the detailed code generation function is performed. For example, when a unit count is set to one second, the detailed code generation function matches different $M^N$ numbers of codes every second from the time when the detailed code generation function is initially performed. In addition, when a use period of a specific detailed code generation function or a use period of the virtual code generation device 100 (e.g., a validity period of a user terminal in which an application for generating a virtual code is installed) is set to a time length shorter than the time length (e.g., when one count is one second, it is $M^N$ seconds) corresponding to the $M^N$ count, the same code is not redundantly generated during the use period in the first code or the second code. That is, when the count increases over time, in a case where a user requests the virtual code generation device 100 to generate a virtual code at a specific time, the virtual code generation device 100 may generate a code value that is matched to the count corresponding to the specific time, as a first code or a second code.

Specifically, when uppercase letters of the alphabet and numbers 0 to 9 are used as characters that may be included in a code (i.e., 36 characters are used), and six digits are respectively allocated to a first code and a second code, the virtual code generation device 100 may provide 36⁶ codes as the first code and the second code. In this case, the virtual code generation device 100 may match each code for each count, and provide the first code and the second code, which are changed for each count.

In another specific exemplary embodiment for preventing redundant generation of the virtual code, when a use period of the virtual code generation device 100 elapses, a virtual code different from that of the previous use period is generated by changing a function for generating the first code or the second code (i.e., the first function or second function), or by changing a matching relationship between the first code and the second code. In a virtual code, when a first code generated by the first function and a second code generated by the second function are combined to each other, and when a first code generation function or a second code generation function is changed, according to the fact that an order in which the first code or the second code appears is different from that of the previous use period, the virtual code generation device 100 may apply a virtual code generation function for generating a virtual code different from that of the previous period to a new use period. In addition, the virtual code generation device 100 may select the first function and the second function so as to prevent the same code as the virtual code used in the previous use period from generating as a virtual code of each count in the new use period (i.e., a matching relationship of the first code generated according to the first function and the second code generated according to the second function are not included in a matching relationship included in the previous use period in all the counts of the new use period). That is, after the use period in which $M^N$ numbers of codes may be applied once has elapsed, the virtual code generation function of the new use period in which a virtual code overlapping with that of the previous use period is not generated may be applied by adjusting or updating the virtual code generation function.

In addition, in yet another specific exemplary embodiment of preventing redundant generation of a virtual code, in order not to generate virtual codes irrelevantly duplicated for a user in the entire period, the first code may be set as a code value corresponding to a time point (or count) at which a request for generating a virtual code is made among codes matched for each count from an initial time point when the first function is performed, the second code may be set as a code value generated by reflecting a value (e.g., UID) that is always different at the same time point, and the virtual code may be used as a code value in which the first code and the second code are combined to each other. Since the first code has a different code value for each count and the second code has a different code value for each UID at the same time point, the virtual code combining the first code and the second code outputs different code values at all time points.

In addition, in another exemplary embodiment, any one of a plurality of listing rules for arranging M characters in ascending order is applied to the virtual code generation function (or detailed code generation function). That is, the virtual code generation device 100 may apply various rules for arranging M characters in ascending order to the detailed code generation function included in the virtual code generation function. For example, a listing rule that arranges uppercase letters of the alphabet in ascending order may be in the order of A, B, C, ..., and Z, which is a common order, or may also be in the order of A, C, ..., and Z. As the listing rule is changed in the virtual code generation function, the order in which the codes are sequentially matched for each count is accordingly changed from the initial time when the virtual code generation function is performed.

Meanwhile, the virtual code may be generated by using the plurality of UIDs as seed data. Specifically, the virtual code generation device 100 generates a detailed code by using each of the plurality of UIDs. In the present specification, a method of searching for storage locations of three UIDs by using four detailed codes is described for convenience of description, but it is apparent to those skilled in the art that such a search method can be applied to a different number of detailed codes. For example, a search method described below may also be applied to a method of searching for storage locations of first and second UIDs on the basis of the first to third codes.

In the exemplary embodiment, the virtual code generation device 100 generates first to fourth codes by using first to third UIDs.

The third code sets a start point of searching for a storage location of a third UID, and the fourth code sets a search path from the start point to the storage location of the third UID according to a specific search method.

Meanwhile, the second code sets the start point of searching for a storage location of a second UID, and a third UID or a code matched to and stored in the third UID sets a search path from the start point to the storage location of the second UID according to the specific search method.

Meanwhile, the first code sets a start point of searching for a storage location of a first UID, and a second UID or a code matched to and stored in the second UID sets a search path from the start point to the storage location of the first UID according to the specific search method.

In the case of generating the virtual codes in the above manner, when any one of the first to fourth codes is abnormal, the storage location of the first UID is unable to be searched. A virtual code verification device 200 to be described later may improve the security of a virtual code by way of verifying the validity of the virtual code and using a first UID or data matched to and stored in the first UID.

Meanwhile, at least one piece of setting information (e.g., authority information, control command information), user information, and codes for setting search paths of other UIDs are matched to and stored in each of the plurality of UIDs, or a UID itself may include at least one piece of the control command information, user information, and codes for setting the search paths of other UIDs.

In the exemplary embodiment, the virtual code generation device 100 may generate a virtual code by using first to third UIDs as seed data. Each UID may be a UID stored in both the virtual code generation device 100 and the virtual code verification device 200. A code for setting a search path to a storage location of a second UID and information for defining the type of authority granted to a user are matched to and stored in the third UID. A code for setting a search path to a storage location of a first UID and information for defining an effective time for granting authority to the user are matched to and stored in the second UID. A unique value of the virtual code verification device 200 is matched to and stored in the first UID. The virtual code verification device 200 to be described later searches for the storage location of the first UID from the virtual code, and then only when a unique value matched to and stored in the first UID matches a unique value of the virtual code verification device 200, the received virtual code may be determined as valid. This will be described later.

In another exemplary embodiment, the virtual code generation device 100 may generate a virtual code by using the first to third UIDs as seed data. Each UID may be a UID stored in both the virtual code generation device 100 and the virtual code verification device 200. Information for defining the type of authority granted to a user is matched to and stored in the third UID, and is used to set a search path to the storage location of the second UID. Information for defining the effective time for granting authority to the user is matched to and stored in the second UID, and is used to set a search path to the storage location of the first UID. A unique value of the virtual code verification device 200 is matched to and stored in the first UID. The virtual code verification device 200 to be described later searches for the storage location of the first UID from the virtual code, and then only when a unique value matched to and stored in the first UID matches a unique value of the virtual code verification device 200, the received virtual code may be determined as valid. This will be described later.

Meanwhile, the above-described exemplary embodiments have been described on the basis of the first to fourth UIDs, but in some cases, a user may be granted more UIDs. For example, it is assumed that the user is granted first to N-th UIDs (N is a natural number equal to or greater than two).

In this case, the (N−1)-th code sets a start point of searching for a storage location of an (N−1)-th UID, and the N-th UID or a code matched to and stored in the N-th UID sets a search path from the start point to the storage location of the (N−1)-th UID according to a specific method.

Meanwhile, according to the exemplary embodiment of the present disclosure, the order of the plurality of UIDs may be set according to an order that is set on the basis of the importance of matching information. For example, in the case of user authentication information, authority information, and authority effective time information, the user authentication information may be matched to and stored in the first UID, the authority information may be matched to and stored in the second UID, and the authority effective time information may be matched to and stored in the third UID. Meanwhile, a preset order may be set by the server 40 or the virtual code verification device 200 when a user is granted the plurality of UIDs.

In another exemplary embodiment, the virtual code generation device 100 receives pre-stored authority information or authority information from a user when a request for generating a virtual code is made, and then generates a virtual code by using, as seed data, a pre-stored unique value and the authority information of the virtual code verification device 200. Specifically, the information defining the type of authority granted to a user sets a search path to the storage location of the information defining effective time for authorizing the user. The information defining the effective time for authorizing the user sets the search path to the storage location of the unique value of the virtual code verification device 200. After searching for the unique value from the virtual code, the virtual code verification device 200 to be described later may determine that the received virtual code is valid only when the searched unique value matches the unique value of the virtual code verification device 200. This will be described later.

Each UID may be a UID stored in both the virtual code generation device 100 and the virtual code verification device 200. Information for defining the type of authority granted to the user is matched to and stored in the third UID, and is used to set a search path to the storage location of the second UID. Information for defining the effective time for granting authority to the user is matched to and stored in the second UID, and is used to set a search path to the storage location of the first UID. A unique value of the virtual code verification device 200 is matched to and stored in the first UID. The virtual code verification device 200 to be described later searches for the storage location of the first UID from the virtual code, and then only when a unique value matched to and stored in the first UID matches a unique value of the virtual code verification device 200, the received virtual code may be determined as valid. This will be described later.

Meanwhile, when there is a request for generating a virtual code, the virtual code generation device 100 may receive authority information set by and transmitted from the user. The setting information may be utilized in two different ways.

First, when there is a request for generating a virtual code, the virtual code generation device 100 may receive authority information, user information, and the like from a user and set the information, and then transmit the setting information to the virtual code verification device 200 in real time. The virtual code verification device 200 matches the received setting information to at least one of the plurality of UIDs, and then stores the matched setting information. That is, the information set, by the user, in the virtual code generation device 100 is matched to and stored in at least one of the plurality of UIDs. Meanwhile, at least one piece of setting information among the plurality of setting information may not be set by a user input. For example, in the case of a preset value in the virtual code verification device 200, such as an identifier of the virtual code verification device 200, the setting information may be transmitted to the virtual code verification device 200 in real time together with the remaining setting information input by the user.

Second, in the virtual code generation device 100, a virtual code may be allowed to include the setting information input from a user. The virtual code verification device 200 to be described later stores an authority code corresponding to specific authority in advance, and when a virtual code includes the specific authority code set by a user, the virtual code verification device 200 may grant the authority corresponding to the authority code to the user. To this end, the virtual code may include an authority code area. The virtual code including authority information will be described later.

In another exemplary embodiment, in a case where the virtual code generation device 100 does not receive setting information from the user, the virtual code generation device 100 may generate a virtual code including a specific code. For example, when an authority code is not set by the user, the virtual code including the specific code (e.g., NULL) may be generated in the authority code area. When the specific code is included in an area defining the authority information, the virtual code verification device 200 may extract a UID from the virtual code, and grant authority on the basis of the authority information matched to and stored in the extracted UID.

In another exemplary embodiment, when there is a request for generating a virtual code from the user, the virtual code generation device 100 determines whether communication with the virtual code verification device 200 is possible. When the communication with the virtual code verification device 200 is difficult, the settings (e.g., authority information) may be input from the user, and a virtual code including the input setting information may be generated. In this way, the present disclosure provides the limited access authority that may be granted even when the communication between the virtual code generation device 100 and the virtual code verification device 200 is difficult.

The virtual code provision part 130 serves to provide the generated virtual code to the virtual code reception means 20 to perform user authentication.

Figure 3:
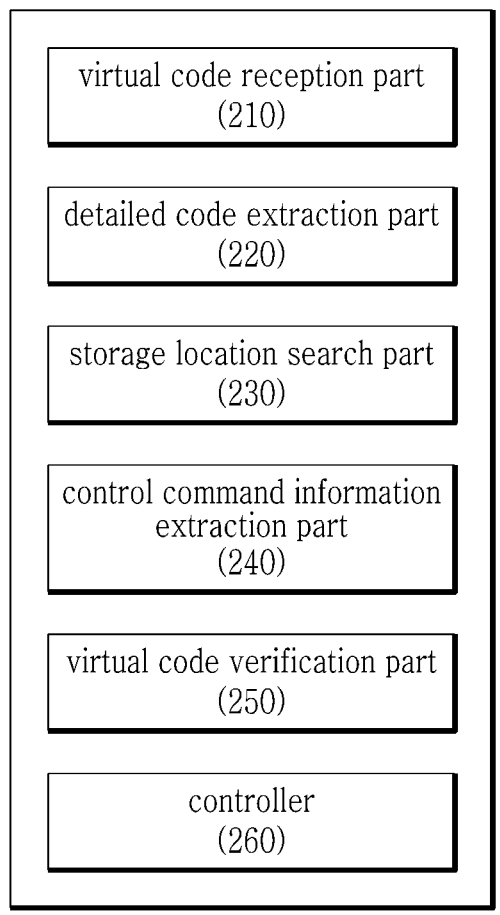
FIG. 3 is a block diagram illustrating a virtual code verification device according to the exemplary embodiment of the present disclosure.

FIG. 3 is a block diagram illustrating a virtual code verification device according to the exemplary embodiment of the present disclosure.

The virtual code verification device 200 may be the above-described virtual code verification means 30 or the server 40.

As shown in FIG. 3, the virtual code verification device 200 includes a virtual code reception part 210, a detailed code extraction part 220, a storage location search part 230, a control command information extraction part 240, a virtual code verification part 250, and a controller 260.

Here, the virtual code verification device 200 extracts the plurality of UIDs on the basis of a virtual code, determines whether the received virtual code is a normal code on the basis of the virtual code, and performs user authentication.

The virtual code reception part 210 serves to receive a request of user authentication on the basis of a virtual code provided from the virtual code provision part 130.

In the exemplary embodiment, the virtual code reception part 210 receives the virtual code generated by the dedicated program 11 from the virtual code reception means 20 to receive the request of user authentication.

The detailed code extraction part 220 serves to extract one or more detailed codes included in a virtual code.

In the exemplary embodiment, the detailed code extraction part 220 includes a detailed code combination function included in the virtual code generation function. Accordingly, when a virtual code includes the plurality of detailed codes, the detailed code extraction part 220 may extract the plurality of detailed codes from the virtual code by applying the detailed code combination function.

For example, when the virtual code generation device 100 generates a virtual code in which four detailed codes (i.e., first to fourth codes) are combined, the detailed code extraction part 220 may separate the first to fourth codes from a character array of the virtual code by applying the detailed code combination function.

The storage location search part 230 serves to search for storage locations of the plurality of UIDs within the storage location search algorithm on the basis of one or more extracted detailed codes. Here, the storage location search algorithm matches the virtual code generation function used when the virtual code generation device 100 generates a virtual code. Various methods may be applied as a method in which a storage location search part 230 searches a storage location of a UID on the basis of each detailed code. In order for the storage location search part 230 to search for a storage location on the basis of the plurality of detailed codes, a correlation between the detailed codes may be included.

The storage location search part 230 sequentially searches for storage locations of the plurality of UIDs by using the plurality of detailed codes.

The storage location of a UID first searched for by the storage location search part 230 refers to a point (i.e., count) on a track corresponding to a time point when registration of the virtual code generation means 10 is requested by a user. That is, when the track for the corresponding virtual code generation means 10 is driven in the virtual code verification device 200 and registration of user information is requested by a particular user at a specific time, the corresponding user information is registered in a count appropriate to the corresponding time point (i.e., a count that has elapsed from the last driving time of the track to the time of registration).

When a virtual code is composed of first to fourth codes, in the exemplary embodiment having a correlation between the detailed codes, the storage location search part 230 may determine a search start point corresponding to the third code, and the storage location search part 230 may search for, as the storage location of the third UID, a point moved along a search path corresponding to the fourth code from the search start point. That is, the detailed code may include: a third code for setting a start point of searching for a storage location; and a fourth code for setting a search path from the start point to the storage location of the third UID according to a specific search method.

In this case, the storage location of the third UID refers to a point (i.e., count) on the track corresponding to a time point when the registration of the virtual code generation means 10 is requested by the user. The storage location search part 230 may search the storage location of the third UID by using the third and fourth codes.

Meanwhile, the storage location search part 230 may search for a UID in a different method according to the method of generating a virtual code.

In the exemplary embodiment, when authority information, user information, and a code for setting a search path to a storage location of another UID are matched to and stored in each of the plurality of UIDs, the storage location search part 230 searches a third UID by using the third and fourth codes, and searches a second UID by using the second code and a code for setting a search path to a storage location of the second UID matched to and stored in the third UID. Thereafter, the storage location search part 230 searches for a first UID by using the first code and a code setting a search path to a storage location of the first UID matched to and stored in the second UID.

For example, the code for setting the search path to the storage location of the second UID and information for defining the type of authority granted to the user are matched to and stored in the third UID, the code for setting the search path to the storage location of the first UID and information for defining effective time for granting authority to the user are matched to and stored in the second UID, and a unique value of the virtual code verification device 200 is matched to and stored in the first UID. The storage location search part 230 searches for the third UID by using the third and fourth codes, and searches for the second UID by using the second code and the code for setting the search path to the storage location of the second UID matched to and stored in the third UID. Thereafter, the storage location search part 230 searches for a first UID by using the first code and the code setting the search path to the storage location of the first UID matched to and stored in the second UID. In addition, the control command information extraction part 240 extracts information for defining the type of authority granted to the user matched to and stored in the first to third UIDs, and information for defining the effective time for granting the authority to the user, and then transmits the information to the controller 260.

In another exemplary embodiment, in a case where each of the plurality of UIDs is a code for setting a search path to a storage location of another UID, and at the same time, pieces of authority information and user information are matched to and stored in each of the plurality of UIDs, the storage location search part 230 searches a third UID by using third and fourth codes and searches a second UID by using the third UID and a second code. Thereafter, the storage location search part 230 searches for a first UID by using the second UID and a first code.

For example, information for defining the type of authority granted to the user is matched to and stored in the third UID, and the third UID is used as the code for setting the search path to the storage location of the second UID. Meanwhile, the information for defining the effective time for granting authority to the user is matched to and stored in the second UID, and the second UID is used as the code for setting the search path to the storage location of the first UID. A unique value of the virtual code verification device 200 is matched to and stored in the first UID. The storage location search part 230 searches for the third UID by using the third and fourth codes, and searches for the second UID by using the third UID and the second code. Thereafter, the storage location search part 230 searches for a first UID by using the second UID and a first code. In addition, the control command information extraction part 240 extracts information for defining the type of authority granted to the user matched to and stored in the first to third UIDs, and the information for defining the effective time for granting the authority to the user, and then transmits the information to the controller 260.

In another exemplary embodiment, in a case where each of the plurality of UIDs is a code for setting a search path to a storage location of another UID, and at the same time, each of the plurality of UIDs is authority information or user information, the storage location search part 230 searches a third UID by using third and fourth codes and searches a second UID by using the third UID and a second code. Thereafter, the storage location search part 230 searches for a first UID by using the second UID and a first code.

For example, the third UID is the information for defining the code for setting the search path to the storage location of the second UID and the type of authority granted to the user, the second UID is the information for defining the code for setting the search path to the storage location of the first UID and the effective time for granting the authority to the user, and the first UID is the unique value of the virtual code verification device 200. The storage location search part 230 searches for the third UID by using the third and fourth codes, and searches for the second UID by using the third UID and the second code. Thereafter, the storage location search part 230 searches for a first UID by using the second UID and a first code. In addition, the control command information extraction part 240 transmits the second and third UIDs to the controller 260.

As described above, the storage location search part 230 searches for a UID in a different method according to the type of seed data used to generate a virtual code.

In addition, in another exemplary embodiment, as the virtual code generation device 100 provides a new virtual code for each unit count, the virtual code verification device 200 may search a storage location of a third UID by setting a search start point and a search path on the basis of third and fourth codes, which are changed for each count.

In addition, in another exemplary embodiment, the storage location search part 230 may include a storage location search algorithm in order to find a storage location of a UID by using the plurality of detailed codes having correlations thereof. The storage location search algorithm is an algorithm that makes it possible to search for the storage location when each detailed code included in a virtual code is applied, and is matched to a virtual code generation function used when the virtual code generation device 100 generates the virtual code.

For example, when a virtual code includes a third code for determining a search start point of a storage location and a fourth code for indicating a direction of the storage location from the search start point, the storage location search algorithm refers to an algorithm for controlling the storage location, to which registration time of a third UID is matched, to be located in a corresponding location when the direction corresponding to the fourth code is indicated at a point corresponding to the third code.

After searching for the third UID, the storage location search part 230 searches for a storage location of the second UID by using the searched third UID and a second code.

In the exemplary embodiment, the storage location search part 230 searches for the second UID by using the second code as the start point of searching for the storage location of the second UID, and utilizing the third UID as the code for indicating the direction of the storage location from the search start point.

In another exemplary embodiment, the storage location search part 230 searches for the second UID by using the second code as the start point of searching for the storage location of the second UID, and utilizing the code indicating the direction of the storage location from the search start point matched to and stored in the third UID.

After searching for the second UID, the storage location search part 230 searches for the storage location of the first UID by using the searched second UID and the first code.

In the exemplary embodiment, the storage location search part 230 searches for the first UID by using the first code as the start point of searching for the storage location of the first UID, and utilizing the second UID as the code for indicating the direction of the storage location from the search start point.

In another exemplary embodiment, the storage location search part 230 searches for the first UID by using the first code as the start point of searching for the storage location of the first UID, and utilizing the code indicating the direction of the storage location from the search start point matched to and stored in the second UID.

In the methods described above, the storage location search part 230 may sequentially search for three UIDs by using four virtual codes.

The control command information extraction part 240 extracts authority information matched to and stored in a storage location of a UID searched for by the storage location search part 230. That is, the virtual code verification device 200 may extract control command information matched to and stored in the storage location of each UID within the storage location search algorithm. Meanwhile, when a UID itself consists of authority information, the control command information extraction part 240 transmits the searched UID to the controller 260.

The controller 260 performs control according to the extracted control command information.

By using the storage location search algorithm, the virtual code verification device 200 may search for a storage location of a UID even when a part of a code included in a virtual code is changed. Various methods may be applied to the storage location search algorithm, and specific examples will be described later. However, the storage location search algorithm is not limited to the examples described later.

Figure 5:
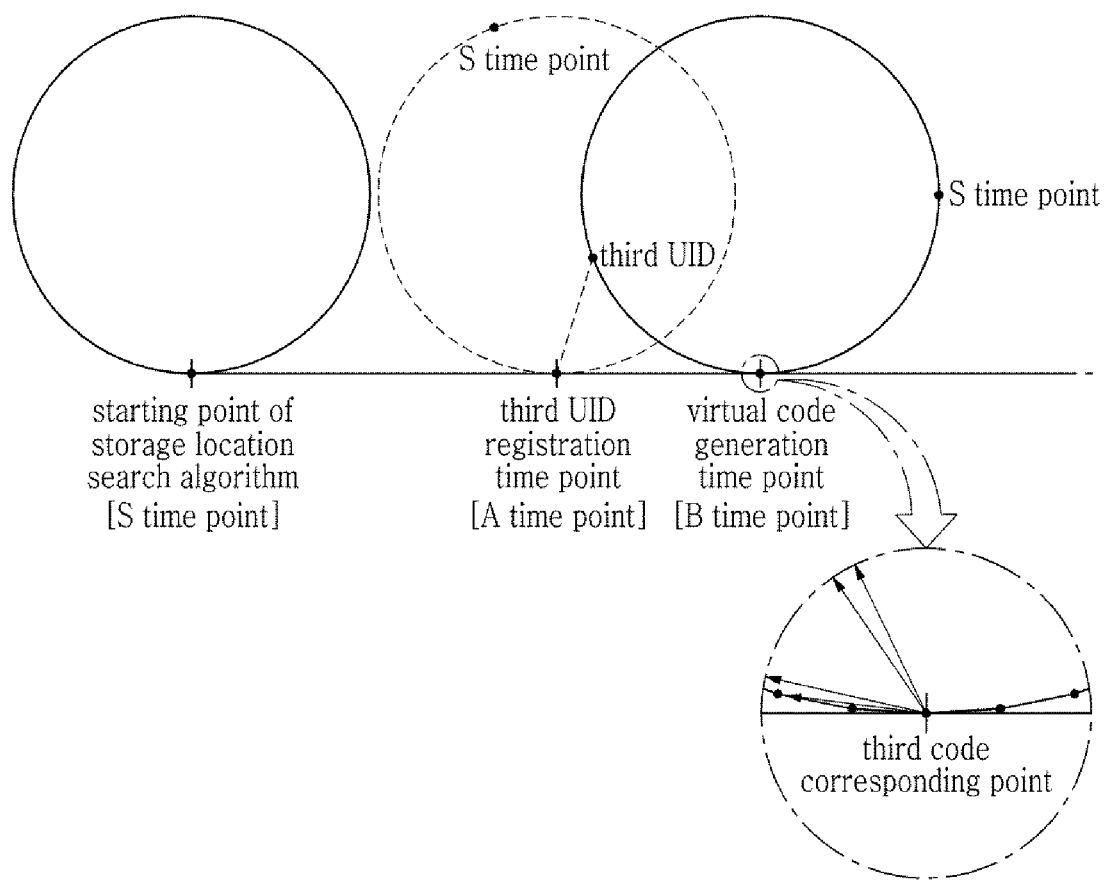
FIG. 5 is an exemplary view illustrating a storage location search algorithm for searching for a storage location of a UID through rolling movement of a k-angle polygon according to the exemplary embodiment of the present disclosure.

For example, referring to FIG. 5, when a storage location search algorithm is a k-angle polygon (k is $M^N$) that moves by rolling along a track in which $M^N$ numbers of codes corresponding to a third code are listed, and a vertex of the k-angle polygon moves while corresponding to a point where a code is placed on the track of the third code, each vertex of the k-angle polygon is matched to a storage location of a UID and a point at which the track of the third code (i.e., a first track) and the k-angle polygon correspond to each other may be a start point of searching for a storage location corresponding to the third code. In this case, the storage location search part 230 may apply rolling movement to the k-angle polygon so that the vertex of the k-angle polygon is in contact with a point corresponding to the third code extracted by the detailed code extraction part 220. In this way, according to indication of an angle (e.g., a specific angle divided into $M^N$ pieces of 180 degrees to face a vertex of the k-angle polygon) corresponding to a fourth code at a location on the first track with which the k-angle polygon is in contact, the storage location search part 230 may search for the vertex of the k-angle polygon, which is a storage location in which a UID corresponding to a virtual code is stored.

Specifically, as shown in FIG. 5, the virtual code verification device 200 moves a k-angle polygon by rolling movement to a point corresponding to a third code (i.e., moving the k-angle polygon while making each vertex of the k-angle polygon and each point on a track tangent to each other in turn). Thereafter, the virtual code verification device 200 searches for a vertex corresponding to a storage location by indicating a direction of an angle corresponding to a second code. In the above-described method, the storage location search part 230 may search for first and second UIDs.

After the storage location of the third UID is searched for by the storage location search part 230 by using the third code and the fourth code in the virtual code within the storage location search algorithm, the control command information extraction part 240 extracts authority information matched to and stored in the corresponding location.

A detailed description of other various storage location search algorithms will be described later.

The virtual code verification part 250 serves to verify a virtual code by comparing a time point when the virtual code reception part 210 receives the virtual code and a time point when the virtual code is generated by using a virtual code generation function in the virtual code generation means (i.e., a user terminal).

Figure 6:
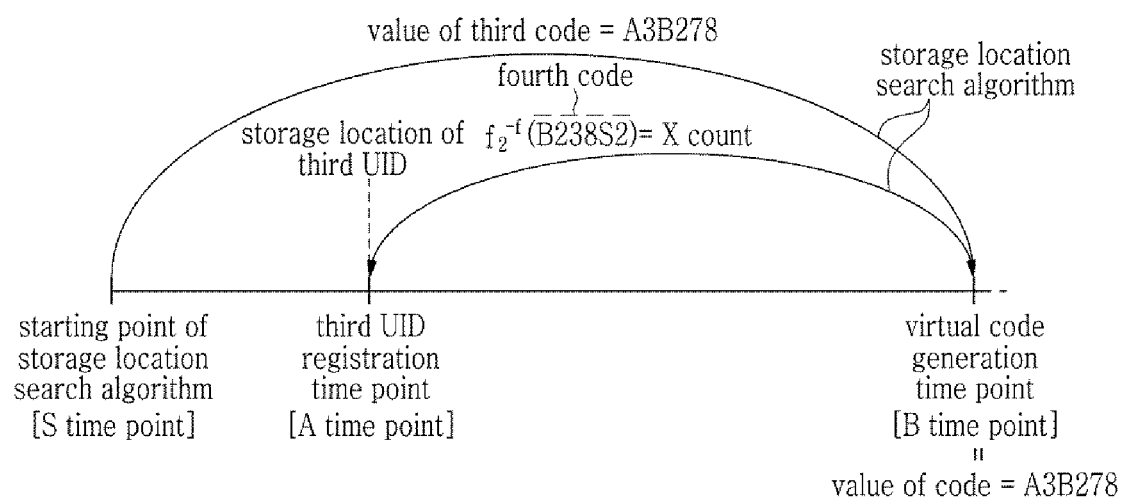
FIG. 6 is an exemplary view for describing verification of the virtual code according to the exemplary embodiment of the present disclosure.

In the exemplary embodiment, referring to FIG. 6, by comparing the time point when a virtual code is received and the time point when the virtual code is generated by using the virtual code generation function in the dedicated program 11 built-in or installed in the user terminal, the virtual code verification part 250 may determine that the received virtual code is a normal code when the generation time point is within a preset error range from the reception time point.

In addition, in another exemplary embodiment of a method of verifying a virtual code, a third code and a fourth code may be codes for reference counts added as much as an OTP code randomly generated from a time point when a UID is registered by the virtual code generation means 10 or a time point when user authentication is requested.

In a specific exemplary embodiment, the virtual code generation device 100 generates a virtual security code by reflecting a third code and a fourth code without outputting the virtual security code to the outside. The virtual code generation means (e.g., the dedicated program for generating a virtual code) generates a value of the virtual security code (e.g., an OTP code) on the basis of a third UID, generates the third code of a count to which the value of the virtual security code is added at the registration time of the third UID, and generates the fourth code of the count corresponding to the value of the virtual security code (i.e., the virtual security code itself is generated as a fourth code). That is, the third code and the fourth code are generated on the basis of the count shifted by the value of the virtual security code from a time point A in which the third UID is registered in the virtual code verification device 200 by the virtual code generation device 100. The count shifted from the time point A may be a count before or after the count corresponding to a current time point according to the generated value of the virtual security code. The virtual code verification device 200 may search a storage location (or registration location) of the third UID by applying the received third code and fourth code to the storage location search algorithm.

Meanwhile, in the exemplary embodiment of the present disclosure, the virtual security code may be generated on the basis of time data at a time point of generating a virtual code or time data at a time point of requesting authentication of user setting information on the basis of the virtual code. In addition, in the exemplary embodiment of the present disclosure, when specific information including time data among the user setting information exists, a virtual security code may be generated on the basis of the time data of the corresponding information. For example, when the virtual code verification device 200 is a vehicle or personal mobility, a virtual security code may also be generated on the basis of time data such as the effective time of the virtual code set for a corresponding device, rental start time of the device, and rental end time of the device.

In addition, in another exemplary embodiment, the virtual code verification device 200 extracts a virtual security code from a fourth code generated on the basis of the virtual security code, and then checks whether there is a value that matches the virtual security code among OTP numbers calculated by inputting a count, within a specific range, from the count of receiving a virtual code through a virtual security code generation function (i.e., an OTP function). The virtual code verification device 200 applies an inverse function of a second function to a fourth code to obtain a value of the virtual security code (i.e., a value of the OTP function) used to generate the fourth code, and searches a count that generates the same value as the value of the virtual security code. Due to transmission time or delay of the virtual code, there is a difference between a time point when a virtual security code is generated by the virtual code generation means and a time point when the virtual code verification means receives the virtual security code, so a count at which the virtual code verification means has received the virtual code and a count at which an OTP number corresponding to the virtual security code is generated may not match each other, whereby the virtual code verification device 200 allows an error range from the count of receiving the virtual code. In this way, the virtual code verification device 200 may prevent user authentication from being performed with a previously generated virtual code instead of a currently generated virtual code, and thus security may be improved. In addition, even when a user does not input a virtual security code of a specific digit when the user inputs a virtual code, the virtual code verification device 200 may verify the user by searching for the virtual security code by itself.

In the exemplary embodiment, formulas for generating first to fourth codes by a dedicated program for generating a virtual code is as follows:

First code=first UID+second UID

Second code=second UID+third UID

Third code=third UID+OTP (i.e., a virtual security code based on a virtual code available time point for which a user has set authority.)

Fourth code=OTP (i.e., the virtual security code based on the virtual code available time point for which the user has set the authority.)

When a request for generating a virtual code requested from a user is approved, the virtual code generation device 100 generates a virtual security code on the basis of receiving an input of a validity period of the virtual code from the user, or on the basis of using validity period information matched to and stored in a third UID selected by the user, thereby generating the third and fourth codes on the basis of the generated virtual security code.

Thereafter, the virtual code generation device 100 generates a second code on the basis of a second UID and the third UID. The second code serves to set a time point of searching for a storage location of the second UID. Finally, the virtual code generation device 100 generates a first code on the basis of a first UID and the second UID. The first code serves to set a search time point to a storage location of the first UID.

The virtual code verification device 200 searches for locations where first to third UIDs are stored on the basis of first to fourth codes in a received virtual code, generates, on the basis of the searched storage locations, a virtual security code (i.e., OTP number) within a specific count range from the time point of receiving a user authentication request, and determines whether there is a code identical to a virtual security code extracted from the virtual code among the generated virtual security codes. The virtual code verification device 200 determines that the virtual code is valid when there is the code identical to the virtual security code extracted from the virtual code among the generated virtual security codes.

Meanwhile, the virtual code verification device 200 verifies the validity of a virtual code by using a first UID searched last from the virtual code in addition to the above-described validity verification method. For example, the virtual code verification device 200 may determine that the virtual code is valid only when the searched first UID matches the previously stored UID, or the unique value matched to and stored in to the first UID matches a unique value of the virtual code verification device 200.

Meanwhile, the virtual code generation device 100 may generate a virtual code capable of performing a control command even when the virtual code generation device 100 is not registered with the virtual code verification device 200.

In the exemplary embodiment, the virtual code generation device 100 may generate first and second codes by using the unique value of the virtual code verification device 200 as seed data. In this case, the virtual code generation device 100 may receive authority information from a user, and then include the received authority information in a virtual code. After extracting the unique value from the first and second codes, the virtual code verification device 200 determines whether the extracted unique value matches the unique value of the virtual code verification device 200. When the extracted unique value matches the unique value of the virtual code verification device 200, the virtual code verification device 200 extracts authority information from the virtual code and then grants access authority corresponding to the authority information. In this way, the embodiments of the present disclosure allows a user to perform user authentication to another person even when the user does not register the virtual code generation device 100 with the virtual code verification device 200.

Meanwhile, in another exemplary embodiment of the present disclosure, a virtual code may be generated on the basis of an identifier of the virtual code generation device 100 and control command information that is input to the virtual code generation means. In this case, first data is generated on the basis of the identifier and a control command, and a secret value corresponding to the control command information and the identifier is applied to a hash function, thereby generating a hash value. Then, the hash value is applied to the virtual code generation function to finally generate a virtual code. More specifically, an identifier and a control command are input to an encoder to generate first data, and control command information and a secret value are input to the hash function to generate a first hash value. In addition, the virtual code is finally generated on the basis of the first data and the first hash value. Meanwhile, time data at a time point when the virtual code is generated by the virtual code generation device 100 or at a time point when user authentication is requested may be further utilized. In this case, the time data may be used as each piece of seed data of the first data and the first hash value.

Meanwhile, in order to verify the virtual code generated according to the method described above, the virtual code verification device 200 may include a decoder device corresponding to an encoder device, and include the same hash function as that of the virtual code generation device 100. Specifically, the virtual code verification device 200 extracts the first data and the first hash value from the virtual code received from the virtual code generation device 100. Then, each piece of the control command information and each identifier are searched for on the basis of the first data. In this case, the secret value is extracted from the identifier stored in the virtual code generation device 100, and the hash value is calculated by applying the secret value and the searched control command information to the hash function. In addition, a verification process for a virtual code may be performed by comparing the calculated hash value with the first hash value extracted from the virtual code.

Meanwhile, by comparing the first hash value with a hash value calculated by applying the time data of a time point, the control command information, and the identifier to the hash function, the virtual code verification device 200 may verify whether the virtual code corresponds to a virtual code generated at the current time point when a virtual code is generated further on the basis of the time data described above.

When the verification of the virtual code is completed by the virtual code verification part 250, the controller 260 performs control corresponding to the control command information extracted by using the virtual code.

In the exemplary embodiment, in the case of user authentication at the time of entry and exit, first to third UIDs are searched for by the storage location search part 230, and when the virtual code verification part 250 completes the verification of whether a virtual code is normally generated or not, the controller 260 determines whether to authenticate the user on the basis of authority information extracted by the control command information extraction part 240.

Specifically, the controller 260 determines whether to authenticate the user by comparing validity period information included in the authority information with the time point when the user authentication is requested.

In the exemplary embodiment, the user may register the validity period through the dedicated program 11 when registering a UID in the virtual code verification device 200 or after registering first to third UIDs in the virtual code verification device 200. The dedicated program 11 stores the validity period input from the user by matching the validity period to any one of the first to third UIDs. Through the dedicated program 11, the user may change or delete the validity period matched to the UID.

In the exemplary embodiment, the controller 260 performs user authentication when a time point at which a request for user authentication is made is within a range of the valid period matched to and stored in the UID. For a specific example, when a user sets a validity period from 9:00 am to 10:00 am, the controller 260 performs user authentication only for a request for user authentication made between 9:00 am and 10:00 am.

In another exemplary embodiment, the user may register the type of access authority through the dedicated program 11 when registering a UID in the virtual code verification device 200 or after registering first to third UIDs in the virtual code verification device 200. The dedicated program 11 stores the type of access authority input from the user by matching to any one of the first to third UIDs. Through the dedicated program 11, the user may change or delete the type of access authority matched to the UID.

In the exemplary embodiment, the controller 260 performs user authentication corresponding to the type of access authority included in the authority information. In a case where the virtual code verification device 200 is a vehicle, the controller 260 may grant any one of vehicle interior access authority, vehicle starting authority, and vehicle driving authority on the basis of the authority information. When the vehicle interior access authority is granted, the vehicle unlocks a vehicle's door lock and prevents other functions of the vehicle from being executed. For example, when a user desires to receive a non-face-to-face repair or car wash service for a vehicle, the user may include only the vehicle interior access authority. That is, the vehicle starting authority, the vehicle driving authority, and the like are not granted.

Meanwhile, when the vehicle starting authority is granted, the vehicle unlocks the door lock of the vehicle, allows an engine to be started when the user who entered the vehicle starts the engine, and does not allow the vehicle to move in a state of starting the vehicle. In addition, when the vehicle driving authority is granted, the vehicle allows the user to use all the functions of the vehicle.

In another exemplary embodiment, in a case where the virtual code verification device 200 is personal mobility, the controller 260 may grant any one of personal mobility starting authority and personal mobility driving authority on the basis of the authority information. When the personal mobility starting authority is granted, the personal mobility starts working and prevents other functions from executing. In addition, when the personal mobility driving authority is granted, the personal mobility allows the user to use all the functions (i.e., acceleration, deceleration, stop, and the like) of the corresponding personal mobility.

In another exemplary embodiment, in a case where the virtual code verification device 200 is a mobile terminal, the user may register an application executable in the mobile terminal through the dedicated program 11 when registering the first to third UIDs in the virtual code verification device 200 or after registering the UIDs in the virtual code verification device 200. Thereafter, the mobile terminal allows only the registered application to be executed during user authentication.

Meanwhile, in a case where the virtual code verification device 200 is a meter of electricity, gas, and the like, the controller 260 allows a user to use electricity, gas, and the like according to a charge amount matched to and stored in any one of first to third UIDs only when a virtual code is input within a validity period matched to and stored in any one of the first to third UIDs.

In another exemplary embodiment, the controller 260 performs control on the basis of at least one of the first to third UIDs. For example, the controller 260 may determine the validity period of the virtual code based on a value of the third UID itself, and may determine the charge amount based on a value of the second UID itself. Meanwhile, the controller 260 grants the use authority for electricity, gas, and the like only when a value of the first UID matches the pre-stored UID value or the value of the first UID matches the unique value of the virtual code verification device 200.

Figure 4:
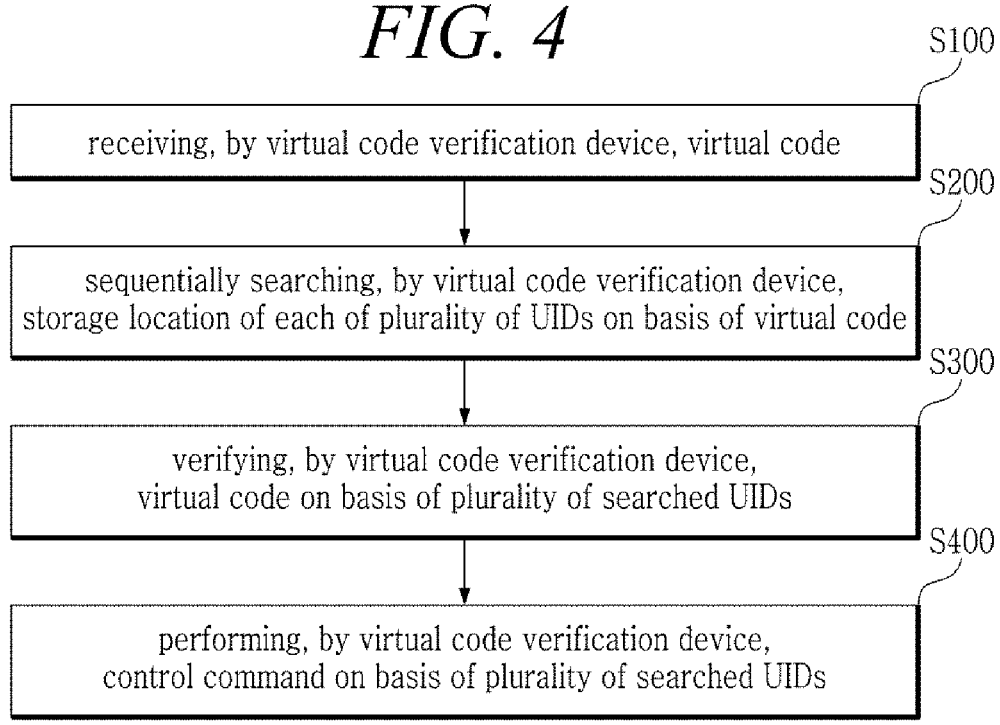
FIG. 4 is a flowchart illustrating a method of authenticating a user by using the virtual code according to the exemplary embodiment of the present disclosure.

FIG. 4 is a flowchart illustrating a control method using a virtual code according to the exemplary embodiment of the present disclosure.

Referring to FIG. 4, the control method using a virtual code according to the exemplary embodiment of the present disclosure includes: a step S100 of receiving a virtual code, wherein a virtual code authentication device receives the virtual code; a step S200 of searching for a storage location, wherein the virtual code authentication device searches for a plurality of UIDs on the basis of the virtual code; a step S300 of verifying, by the virtual code authentication device, the virtual code on the basis of the plurality of searched UIDs; and a step S400 of performing a control command on the basis of the searched UIDs. Hereinafter, a detailed description of each step is described. However, a detailed disclosure of the above-described content will be omitted in the process of describing a virtual code generation device 100 (i.e., a user terminal including a dedicated program), a virtual code verification device 200 (i.e., a virtual code verification means 30), and a server 40.

In step S100, the virtual code verification device 200 receives a virtual code.

In the exemplary embodiment, the virtual code verification device 200 may receive the virtual code for user authentication. In this case, a control command performed by the virtual code verification device 200 is user authentication.

In another exemplary embodiment, in a case where the virtual code verification device 200 is a meter for electricity or gas, the virtual code verification device 200 may receive a virtual code purchased by a user.

According to the exemplary embodiment, a virtual code may be generated on the basis of the plurality of UIDs included in the virtual code generation device 100.

The virtual code generation device 100 generates a virtual code on the basis of the plurality of UIDs by using a virtual code generation function included in the dedicated program 11, and provides the generated virtual code to the virtual code verification device 200.

In the exemplary embodiment, the virtual code generation device 100 may generate each detailed code by using the dedicated program 11 that uses the UIDs as seed data of each detailed code generation function.

Thereafter, in step S200, the virtual code verification device 200 sequentially searches for storage locations of the plurality of UIDs within the storage location search algorithm on the basis of the virtual code. Here, the storage location search algorithm is matched to the virtual code generation function included in the dedicated program 11 built-in or installed in the virtual code generation device 100 (i.e., the user terminal), and the storage locations of the plurality of UIDs may be searched for on the basis of at least one detailed code in the virtual code.

In the exemplary embodiment, separate control command information may be matched to and stored in each UID. The user may register the control command information together when registering UIDs, or register only the UIDs first, and then may update the control command information as needed.

For example, when registering the plurality of UIDs, the user may register the validity period of a virtual code together, or register only the UIDs first, and then may update the validity period of the virtual code as needed.

After the UIDs are registered in the virtual code verification device 200, the virtual code verification device 200 receives the virtual code through the virtual code generation device 100 and receives a request for user authentication, so that when receiving the request of user authentication, on the basis of the received virtual code, the user may be identified by searching for the UIDs stored within the storage location search algorithm.

According to the exemplary embodiment, when a virtual code is generated by combining first to fourth codes, the server 40 uses the first to fourth codes to search for storage locations of the first to third UIDs within the storage location search algorithm.

As shown in FIG. 5, the virtual code verification device 200 sets a location corresponding to the third code as a start point, and on the basis of the second code according to the search method applied to the fourth code, the virtual code verification device 200 searches points (i.e., each specific vertex of the k-angle polygon) that are respectively matched to storage locations of the UIDs in an arrangement state of the k-angle polygon. The storage location is matched to each vertex of the k-angle polygon. The point at which a track of a third code (i.e., a first track) and the k-angle polygon correspond to each other becomes a start point of searching for a storage location corresponding to a fourth code. The virtual code verification device 200 searches a matching point of each storage location of the UIDs on the basis of the fourth code at the search start point.

Various methods may be applied as the method of searching for each storage location in the k-angle polygon on the basis of the fourth code. As an example, the virtual code verification device 200 indicates an angle (e.g., a specific angle obtained by dividing 180 degrees into $M^N$ pieces to face a vertex of the k-angle polygon) corresponding to a second code at a location on the first track with which the k-angle polygon is in contact, thereby searching for the k-angle polygon vertex, which is the storage location where the UID is stored, on the basis of the virtual code.

In addition, as another example, in a state in which the k-angle polygon is in contact with a point corresponding to the third code on the first track, the virtual code verification device 200 divides the total central angle (i.e., 360 degrees) into $M^N$ pieces on the basis of the center of the k-angle polygon and a contact point on the first track, and then matches each angle to the $M^N$ numbers of the third codes. In this case, a direction of a line moving a specific number of unit angles (i.e., 360 degrees/$M^N$) from a line connecting the center of the k-angle polygon and the contact point on the first track becomes a specific vertex of the k-angle polygon. Accordingly, when a fourth code corresponding to a specific angle is received, the virtual code verification device 200 may search for the vertex located in the corresponding angle direction.

In addition, as another example, a specific digit of the fourth code may be used to determine a direction for calculating an angle. That is, when a third code is generated by using N characters (N is a natural number), the direction for measuring an angle may be determined with one digit. For example, in a case where the total central angle (i.e., 360 degrees) is divided into angles on the basis of the center of a k-angle polygon and a contact point on the first track to match a fourth code to each of the angles, the virtual code verification device 200 may determine, by using a value of one digit, whether an angle is measured in the left direction or in the right direction from a line connecting the center of the k-angle polygon and the contact point on the first track.

For example, in the storage location search algorithm, two different fourth codes may be assigned to one vertex according to the direction for measuring an angle at each vertex on the k-angle polygon. That is, one vertex may be matched to fourth codes different from each other when the vertex is reached by an interior angle and when the vertex is reached by an exterior angle, and storage locations of different UIDs may be connected to the vertex. As another example, in a case of generating a fourth code by using N (N is a natural number) characters, the storage location search algorithm matches half of the total angle (e.g., 360 degrees when dividing on the basis of a central angle) to N−1 pieces of characters, and uses one digit to determine a direction of applying an angle for reaching each vertex.

The method of searching for a storage location in the k-angle polygon on the basis of a fourth code is not limited thereto, and various methods such as a method in which a point dividing, by a specific ratio, an interval between a point on the k-angle polygon corresponding to the fourth code and a contact point on the first track is searched for as a storage location.

Meanwhile, the above-described method of searching for a storage location may be equally applied to the search for the storage locations of the first and second UIDs.

According to another exemplary embodiment, when a virtual code includes a third code and a fourth code that are changed for each unit count, the third code is generated on the basis of a unit count that has elapsed from an initial time point when registration of UIDs is started in the virtual code verification device 200, and the fourth code is generated on the basis of a unit count that has elapsed from a time point when each user has registered the UIDs through the dedicated program 11 installed in the virtual code generation device 100. In this case, the unit count is set at a specific time interval and is changed as the time interval elapses.

Figure 7:
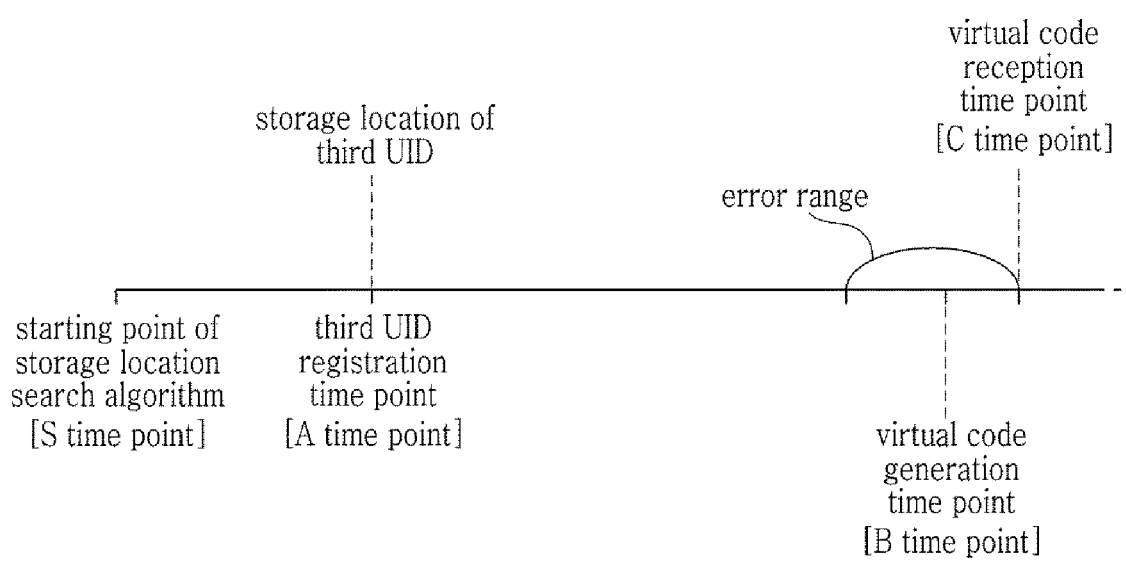
FIG. 7 is an exemplary view illustrating the storage location search algorithm for searching for the storage location of the UID by movement on a track on the basis of a detailed code according to the exemplary embodiment of the present disclosure.

As shown in FIG. 7, the storage location search algorithm is to move to a point matching a storage location of each UID by moving on a track on the basis of the plurality of detailed codes constituting a virtual code.

Specifically, in a case where the virtual code includes a third code generated on the basis of a unit count that has elapsed from an initial time point when the storage location search algorithm is started according to a service that is driven, and a fourth code generated on the basis of a unit count that has elapsed from a time point when each user's third UID is registered, as shown in FIG. 7, the virtual code verification device 200 sets a count, as a search start point, on a track matched to a code value corresponding to the third code, and returns along the track from the search start point by a count value corresponding to the fourth code, thereby searching for a point (i.e., a storage location of the third UID) on the track at the time point when registering the third UID in the virtual code verification device 200. For example, the virtual code verification device 200 sets a search start point by searching for a point (or count) to which a third code is assigned in a virtual code on a track for the third code, and arranges a track for a fourth code in a reverse direction from the search start point to search for a point (or count) to which the fourth code is assigned in the virtual code, thereby extracting a point (or count) at which a third UID is registered on the track for the third code. In addition, for example, the virtual code verification device 200 sets a search start point on the basis of the third code in the virtual code, and regresses by a count value calculated by applying the inverse function of the fourth function to the fourth code in the virtual code, thereby searching for a point corresponding to a registration time of the third UID.

Figure 8:
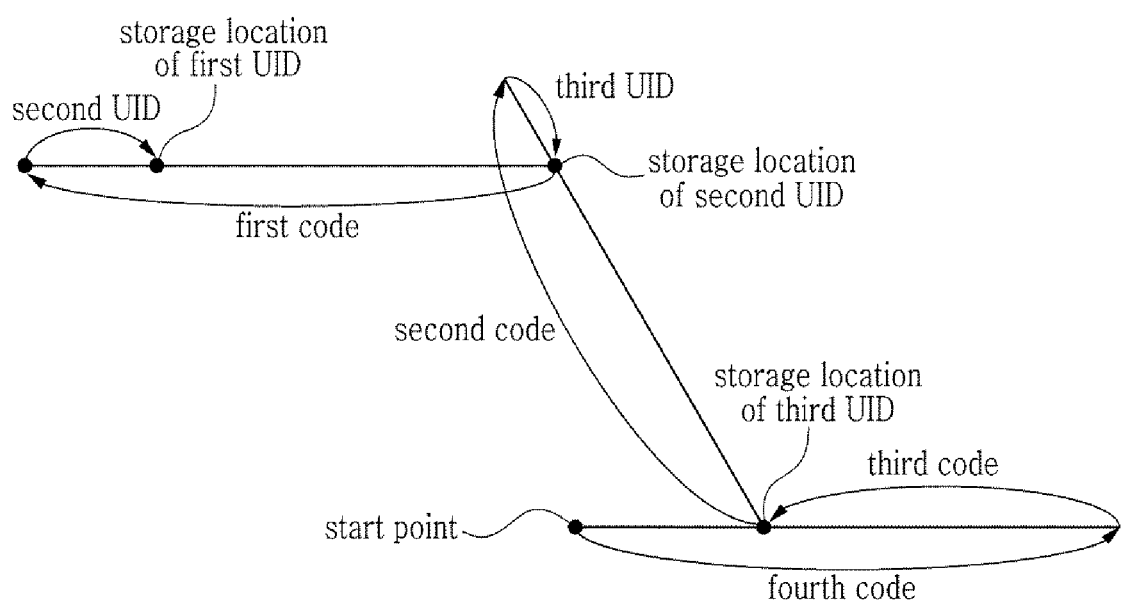
FIG. 8 is an exemplary view for describing a method of searching for a UID according to the exemplary embodiment of the present disclosure.

Meanwhile, as shown in FIG. 8, when the above-described method is used to search for storage locations of the first and second UIDs, the first and second codes set search start points on different tracks from the storage location of the third UID. In addition, the second UID and the first UID, which are sequentially searched, respectively set search paths to the storage locations of the UIDs on the different tracks.

The detailed codes constituting a virtual code are not limited to the first to fourth codes, and as the number of detailed codes constituting the virtual code increases, the number of tracks generated when searching for the storage locations of UIDs may increase.

Thereafter, in step S300, the virtual code verification device 200 verifies the virtual code on the basis of the searched UID. Specifically, the virtual code verification device 200 verifies the virtual code on the basis of the UID (i.e., first UID) searched last from the virtual code. For example, the virtual code verification device 200 determines that the received virtual code is valid only when the UID searched last from the virtual code matches the pre-stored UID, or when the unique value matched to and stored in the UID matches the unique value of the virtual code verification device 200. In this way, the embodiments of the present disclosure may determine that the virtual code is valid only when all UIDs are normally searched from the virtual code.

In another exemplary embodiment, the virtual code verification device 200 verifies the virtual code on the basis of any one of the plurality of UIDs searched from the virtual code. For example, the virtual code verification device 200 defines a validity period of the virtual code among the plurality of UIDs searched for from the virtual code, or verifies validity of the virtual code on the basis of the UID stored by matching the validity period. The virtual code verification device 200 determines that the virtual code is valid only when the virtual code is received within the validity period.

In step S400, when determined that the virtual code is a normal code, the virtual code verification device 200 performs control on the basis of the searched UID.

The virtual code verification device 200 grants access authority through user authentication on the basis of the plurality of searched UIDs. In a case where the virtual code verification device 200 is a vehicle, access authority may be vehicle interior access authority, and when the vehicle interior access authority is granted, the vehicle unlocks the door lock thereof to allow the user to enter the interior of the vehicle.

The above-described access authority may be matched to and stored in the plurality of searched UIDs, or the UIDs itself may define the access authority.

In another exemplary embodiment, in a case where the virtual code verification device 200 is a door lock, access authority may be building interior access authority, and when the building interior access authority is granted, the building unlocks a door lock thereof to allow a user to enter the interior of the building.

In another exemplary embodiment, in a case where virtual code verification device 200 is a mobile terminal, access authority may be use authority for the mobile terminal, and when the use authority for the mobile terminal is granted, the mobile terminal releases a terminal lock state, so that a user may use functions built into the mobile terminal.

Meanwhile, the virtual code verification device 200 may grant access authority in stages. In the exemplary embodiment, in a case where the virtual code verification device 200 is a vehicle, the access authority to the vehicle may include the vehicle interior access authority, vehicle starting authority, and vehicle driving authority. The vehicle starting authority is the authority in which a vehicle may be started and devices provided in the vehicle may be used, but the vehicle is unable to be driven, and thus when only the corresponding authority is granted, the vehicle does not move. In addition, the vehicle driving authority is the authority to be able to use all functions of the vehicle including driving the vehicle. The user may selectively grant the above-described type of authority to another person.

In another exemplary embodiment, in a case where the virtual code verification device 200 is a mobile terminal, access authority may be granted for each application provided in the mobile terminal. For example, a user may grant only access authority to a camera application provided in the mobile terminal to another person.

In another exemplary embodiment, in a case where the virtual code verification device 200 is a meter of electricity, gas, and the like, the virtual code verification device 200 may grant, on the basis of the plurality of searched UIDs, use authority for electricity, gas, and the like as much as the amount charged by the user.

Meanwhile, although not clearly shown in the drawings, the virtual code verification device 200 may further perform a user verification process according to the exemplary embodiment the present disclosure. The user verification process may be performed in conjunction with a verification server 40 related to the virtual code verification device. The user generates a first virtual authentication code for user authentication on the basis of user information. In addition, the user transmits the first virtual authentication code to the server 40. In this case, the server 40 extracts the registered user information, and verifies the user. In this case, in the exemplary embodiment of the present disclosure, a storage location in which the user information is registered is searched for on the basis of a first detailed code and a second detailed code in the first virtual authentication code. The first detailed code may set a search start point of a storage location, and the second detailed code may determine a search path of the storage location. Meanwhile, when the verification of the user is completed on the basis of the first virtual authentication code, the server 40 applies the first virtual authentication code to the hash function to generate a hash value (i.e., a second hash value). Then, the generated hash value and the first virtual authentication code are transmitted to the virtual code generation device 100. According to the exemplary embodiment, the virtual code generation device 100 may generate a first virtual authentication code, store the first virtual authentication code in a memory (not shown), and then receive only the hash value from the server 40. In addition, the virtual code generation device 100 generates a virtual code on the basis of the received hash value and the first virtual authentication code. The identifier or control command of the virtual code generation device 100 is used as seed data of a virtual code. Meanwhile, the virtual code verification device 200 extracts the first virtual authentication code from the received virtual code, and applies the extracted first virtual authentication code to the hash function to calculate a hash value. In addition, by comparing the calculated hash value with a hash value that is generated by the server 40 and included in the virtual code, the verification of service may be performed. To this end, the virtual code verification device 200 includes the same hash function as that of the server 40.

The method of authenticating a user by using a virtual code according to the exemplary embodiment of the present disclosure described above may be implemented as a program (or application) to be executed in combination with a computer, which is hardware, and is stored in a medium.

The above-described program may include a code that is coded in a computer language such as C, C++, JAVA, Ruby, machine language that can be read by a processor (CPU) of the computer through a device interface of the computer in order for the computer to read the program and execute the methods implemented as the program. Such a code may include a functional code related to a function and the like defining features necessary for executing the above methods, and may include a control code related to an execution process necessary for the processor of the computer to execute the features according to a predetermined process. In addition, such a code may further include: additional information necessary for the processor of the computer to execute the features; and a code related to memory reference indicating which location (i.e., address address) that the media is to be referenced in the internal or external memory of the computer. In addition, when the processor of the computer needs to communicate with any other computer or server in a remote location in order to execute the features, the code may further include a communication related code on how to communicate with any other remote computer or server by using a communication module of the computer, and on what information or media should be transmitted and received during communication.

The above medium for storage is not a medium that stores data for a short moment, such as a register, a cache, a memory, and the like, but a medium that stores data semi-permanently and a medium readable by a device. Specifically, examples of the medium for storage include a ROM, a RAM, a CD-ROM, a magnetic tape, a floppy disk, an optical data storage device, and the like, but are not limited thereto. That is, the program may be stored in various recording media on various servers accessible by a computer or in various recording media on the computer of the user. In addition, the media may be distributed in a computer system connected to a network, and a computer-readable code may be stored in a distributed manner.

As described above, although the exemplary embodiments of the present disclosure have been described above with reference to the accompanying drawings, it will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive.

DESCRIPTION OF THE REFERENCE NUMERALS IN THE DRAWINGS

10: virtual code generation means
20: virtual code reception means
30: virtual code verification means
40: server
110: detailed code generation part
120: virtual code generation part
130: virtual code provision part
210: virtual code reception part
220: detailed code extraction part
230: storage location search part
240: control command information extraction part
250: virtual code verification part
260: controller

The invention claimed is:

1. A control method using a virtual code, the method comprising:
   receiving, by a virtual code verification means, the virtual code, wherein the virtual code is generated by a virtual code generation function included in a virtual code generation means registered in the virtual code verification means;
   searching, by the virtual code verification means, a storage location of each of a plurality of UIDs (User Identification) on the basis of the virtual code, which contains information on the storage location of each of the plurality of UIDs;
   verifying, by the virtual code verification means, the virtual code on the basis of the plurality of searched UIDs, wherein the verifying of the virtual code determines that the virtual code is a valid code when a UID searched last among the plurality of UIDs matches a previously stored UID, or information matched to and stored in the UID searched last among the plurality of UIDs matches a preset value; and
   performing, by the virtual code verification means, a control command on the basis of the plurality of searched UIDs,
   wherein, when sequentially searching for the plurality of UIDs, the searching of the storage location is performed by using a firstly searched UID to search for a next UID, which is a secondly searched UID.

2. The method of claim 1, wherein the virtual code comprises a plurality of detailed codes, and
   the searching of the storage location comprises:
   searching for the storage location of any one of the plurality of UIDs on the basis of some of the plurality of detailed codes; and
   searching for another one of the plurality of UIDs on the basis of a remaining part of the plurality of detailed codes and any one of the searched UIDs.

3. The method of claim 2, wherein the virtual code comprises a first code, a second code, and a third code, and
   the searching of the storage location comprises:
   searching for a storage location of a second UID on the basis of the second code and the third code; and
   searching for a storage location of a first UID on the basis of the first code and the second UID.

4. The method of claim 3, wherein the virtual code comprises the first code, the second code, and the third code, and
   the searching of the storage location comprises:
   searching for the storage location of the second UID by setting the second code as a search start time point to the storage location of the second UID and setting the third code as a search path to the storage location of the second UID; and
   searching for the storage location of the first UID by setting the first code as a search start time point to the storage location of the first UID and setting the second UID or a code matched to and stored in the second UID as a search path to the storage location of the first UID.

5. The method of claim 1, wherein the performing of the control command is performed on the basis of control command information matched to and stored in at least one of the plurality of UIDs, and
   the control command corresponding to the at least one of the plurality of UIDs is performed.

6. The method of claim 1, wherein the performing of the control command performs user authentication,
   the virtual code verification means extracts authority information matched to and stored in the storage location of each of the plurality of UIDs, and
   the virtual code verification means performs the user authentication corresponding to the authority information.

7. A non-transitory computer-readable storage medium storing a control program comprising a virtual code used by the control program in order to execute the method of claim 1 in combination with a computer hardware.

8. A virtual code generation device comprising:
   a detailed code generation part configured to generate a plurality of detailed codes on the basis of a plurality of UIDs (User Identification) registered in the virtual code generation device;
   a virtual code generation part configured to generate a virtual code by combining the plurality of detailed codes by using a virtual code generation function; and a virtual code provision part configured to transmit the generated virtual code to a virtual code verification device so that the virtual code verification device executes a control command corresponding to the virtual code, wherein the virtual code generation device generates the plurality of detailed codes so that any one of the plurality of UIDs is utilized for searching for the other one of the plurality of UIDs, and wherein the plurality of detailed codes contain information on storage locations of a plurality of UIDs.

9. A virtual code verification device for executing a control command and authenticating a user, the virtual code verification device comprising:

a virtual code reception part configured to receive a virtual code;

a detailed code extraction part configured to extract a plurality of detailed codes from the virtual code, wherein the plurality of detailed codes contain information on storage locations of a plurality of UIDs (User Identification);

a storage location search part configured to search for a storage location of each of the plurality of UIDs on the basis of the plurality of detailed codes;

a virtual code verification part configured to verify the virtual code on the basis of the plurality of UIDs, wherein the virtual code verification part determines that the virtual code is a valid code when a UID searched last among the plurality of UIDs matches a previously stored UID, or information matched to and stored in the UID searched last among the plurality of UIDs matches a preset value; and a controller configured to perform the control command on the basis of the plurality of UIDs, wherein the storage location search part sequentially searches for the plurality of UIDs, and uses a firstly searched UID to search for a next UID, which is a secondly searched UID.

* * * * *